US010001652B2

(12) United States Patent
Takagi et al.

(10) Patent No.: US 10,001,652 B2
(45) Date of Patent: Jun. 19, 2018

(54) VIRTUAL IMAGE DISPLAY APPARATUS

(71) Applicant: SEIKO EPSON CORPORATION, Tokyo (JP)

(72) Inventors: Masayuki Takagi, Matsumoto (JP); Toshiaki Miyao, Matsumoto (JP); Takashi Takeda, Suwa (JP); Akira Komatsu, Tatsuno-machi (JP); Takuya Ikeda, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 0 days. days.

(21) Appl. No.: 15/428,598

(22) Filed: Feb. 9, 2017

(65) Prior Publication Data
US 2018/0024368 A1 Jan. 25, 2018

(30) Foreign Application Priority Data

Jul. 21, 2016 (JP) ................. 2016-143106

(51) Int. Cl.
G02B 27/14 (2006.01)
G02B 27/01 (2006.01)
F21V 8/00 (2006.01)

(52) U.S. Cl.
CPC ....... *G02B 27/0176* (2013.01); *G02B 6/0001* (2013.01); *G02B 2027/015* (2013.01); *G02B 2027/0169* (2013.01); *G02B 2027/0178* (2013.01)

(58) Field of Classification Search
CPC .................................. G02B 27/0176
USPC .......................................... 359/633
See application file for complete search history.

(56) References Cited

U.S. PATENT DOCUMENTS

2014/0268336 A1* 9/2014 Hiraide .............. G02B 27/0172
359/507

FOREIGN PATENT DOCUMENTS

JP 2004-010759 A 1/2004
JP 2014-186201 A 10/2014

* cited by examiner

*Primary Examiner* — James Jones
(74) *Attorney, Agent, or Firm* — Oliff PLC

(57) ABSTRACT

A virtual image display apparatus includes a case member that stores a image element and is provided with a first end connected to other members, an optical component holding member with which an optical component guiding image light from the image element is assembled and that is provided with a second end connected to the first end, three or more protruding portions that are provided at one of the first end and the second end, have protrusion shapes, and extend toward the other end, three or more grooves that are provided at the other end, have depression shapes corresponding to the three or more protruding portions, and extend, and adhesive portions that fix the three or more protruding portions to the three or more grooves in a state in which the case member is aligned with the optical component holding member.

19 Claims, 19 Drawing Sheets

VIRTUAL IMAGE DISPLAY APPARATUS

BACKGROUND

1. Technical Field

The present invention relates to a virtual image display apparatus which presents a video formed by a image element or the like, to an observer.

2. Related Art

As a virtual image display apparatus such as a head mounted display (hereinafter, referred to as an HMD in some cases) mounted on the head of an observer, there is a display apparatus including a case member storing a image element and the like, and a lens barrel member storing an optical system which guides a video to the eyes of an observer. In order to assemble the lens barrel member, tabular members are provided which extend from upper and lower sides of the case member storing the image element toward the lens barrel member, and the case member is fixed to the lens barrel member via a UV adhesive (ultraviolet curable resin) while the lens barrel member is vertically interposed between the tabular members (for example, refer to JP-A-2014-186201).

However, the above configuration for fixation using a pair of upper and lower tabular members may be strong against a vertical (upward-and-downward direction) external force but may be weak against a horizontal (leftward-and-rightward direction) external force. For example, in a case where miniaturization of an apparatus further progresses so that a gap with another member is reduced, and thus external forces are easily received from various directions, there is concern that deviation may occur when a case member and a lens barrel member are assembled with each other.

SUMMARY

An advantage of some aspects of the invention is to provide a virtual image display apparatus which can achieve miniaturization thereof and has a structure which is strong against an external force (external pressure) applied to a joint portion.

A virtual image display apparatus according to an aspect of the invention includes a case member that stores a image element and is provided with a first end connected to other members; an optical component holding member with which an optical component guiding video light from the image element is assembled and that is provided with a second end connected to the first end; three or more protruding portions that are provided at one of the first end and the second end, have protrusion shapes, and extend toward the other end; three or more grooves that are provided at the other end, have depression shapes corresponding to the three or more protruding portions, and extend; and adhesive portions that fix the three or more protruding portions to the three or more grooves in a state in which the case member is aligned with the optical component holding member, in which, among the three or more protruding portions, at least one protruding portion is disposed on an opposite side to one or more other protruding portions with a display region of the image element interposed therebetween. Storing the image element indicates that the image element is held so as not to be moved, and includes, for example, a case where the image element is supported or fixed in a state in which a part thereof is exposed.

In the virtual image display apparatus, in the case member and the optical component holding member, one end is provided with three or more protruding portions, the other end is provided with three or more grooves respectively corresponding to the three or more protruding portions, and the protruding portions and the grooves are fixed to each other at the adhesive portions. In this case, among the three or more protruding portions, at least one protruding portion is disposed on an opposite side to one or more other protruding portions with the display region of the image element interposed therebetween. In other words, since three or more fixation locations are provided, supporting and fixation locations can be increased and distributed, and thus it is possible to form a structure which is strong against external force from various directions such as a vertical direction or a horizontal direction. The three or more protruding portions structurally extend from one end of the case member and the optical component holding member toward the other end, and thus the apparatus can be miniaturized.

In a specific aspect of the invention, the three or more protruding portions are disposed at positions corresponding to a peripheral side forming an edge portion of the case member so as to be separated from each other. In this case, the three or more protruding portions are separated from each other, and thus stable supporting and fixation can be performed.

In another aspect of the invention, among the three or more protruding portions, at least one protruding portion is disposed on an opposite side to two or more other protruding portions with the display region of the image element interposed therebetween. In this case, for example, alignment can be reliably performed on other optical systems in which an emission direction of video light which is two-dimensionally emitted from the image element is taken into consideration, and fixation after the alignment can also be reliably performed.

In still another aspect of the invention, among the three or more protruding portions, two or more protruding portions are disposed along one side of the image element in a longitudinal direction of the display region of the image element. In this case, the case member and the optical component holding member can be stably fixed to each other without increasing a length in a longitudinal direction. The three or more protruding portions can be stably fixed while disposing two or more protruding portions along one side of the image element and adjusting, for example, a direction of a light emission surface of the image element along an edge of a display region by using the three or more protruding portions.

In still another aspect of the invention, the three or more protruding portions are formed of four protruding portions disposed to correspond to four corners of the case member. In this case, strong fixation can be performed by the four protruding portions.

In still another aspect of the invention, the virtual image display apparatus further includes a wiring member that is located near the first and second ends and is disposed on a lateral side on which external force is applied to the adhesive portions from a direction which is perpendicular to a direction in which the first end and the second end are connected to each other. In this case, for example, it is possible to miniaturize the apparatus by disposing the wiring member near the first and second ends and also to maintain high assembling accuracy due to the protruding portions or the like.

In still another aspect of the invention, each of the three or more grooves has wall surface portions formed of a plurality of surfaces. In this case, two-dimensional fixation can be performed by a plurality of surfaces of the wall surface portion, and thus it is possible to form a structure which is strong against external force (external pressure) from various directions corresponding to the respective surfaces.

In still another aspect of the invention, each of the three or more protruding portions has a prismatic shape, and, in each of the three or more grooves, the wall surface portion is formed of a plurality of surfaces corresponding to a surface shape of a corresponding protruding portion. In this case, the prismatic surface is located two-dimensionally close to the wall surface portion, and thus it is possible to form a structure which is strong against external force (external pressure) applied to the two-dimensional location.

In still another aspect of the invention, the wall surface portion is formed of three or more surfaces which are respectively directed in three directions which are orthogonal to each other. In this case, it is possible to form a structure which is strong against external force (external pressure) from three directions.

In still another aspect of the invention, two of the three directions which are perpendicular to each other are directions which are orthogonal to an optical axis direction of the image element and the optical component. In this case, it is possible to form a structure which is strong against external force (external pressure) from directions which are orthogonal to the optical axis direction.

In still another aspect of the invention, the three or more protruding portions are disposed to be symmetric to each other with respect to the image element. In this case, for example, in a case of a pair of left and right configurations, the protruding portions for the right eye and the left eye can be manufactured in the same shape.

In still another aspect of the invention, the adhesive portions are formed of an adhesive filling the respective grooves when the three or more protruding portions are respectively fixed to the three or more corresponding grooves. In this case, it is possible to form the adhesive portions which are reliably connected through fixation using the adhesive.

In still another aspect of the invention, the adhesive portions are formed of an ultraviolet curable resin. In this case, reliable fixation can be performed in a short period of time through irradiation with ultraviolet light (ultraviolet rays).

In still another aspect of the invention, the first end is provided with the three or more protruding portions, and the case member includes a low reflection coating portion that is provided on at least a surface disposed on a light emission side in the vicinity of the image element, and a surface portion including the three or more protruding portions. In this case, the low reflection coating portion can prevent unexpected reflection and scattering of light, and can form surface unevenness on the protruding portions so as to enhance adhesiveness.

In still another aspect of the invention, the low reflection coating portion is formed on a surface portion including an inclined surface which is inclined with respect to the image element. In this case, particularly, it is possible to prevent reflection and scattering at a location where unexpected light is easily generated.

In still another aspect of the invention, each of the three or more protruding portions has an embossed structure. In this case, it is possible to further increase an adhesive strength by providing the embossed structure.

In still another aspect of the invention, of the first end and the second end, an end provided with the three or more protruding portions is provided with three or more support portions that are provided to respectively correspond to the three or more protruding portions, thicker than the three or more protruding portions, and respectively support the three or more protruding portions. Here, the support portion being thicker than the protruding portion indicates that each support portion has a larger width or thickness than that of each protruding portion, or each support portion is larger than each protruding portion in a case where sizes of sectional shapes thereof are compared with each other. In this case, it is possible to make a structure of a joint location between the first end and the second end stronger by using the three or more support portions.

In still another aspect of the invention, each of the first end and the second end is provided with a void forming portion that is provided at a non-adhesive location and forms a void, and the virtual image display apparatus further includes a sealing member that seals the void formed by the void forming portion. In this case, it is possible to prevent entry of refuse or the like by the sealing member and also to further increase the rigidity of a joint location.

In still another aspect of the invention, the image element includes an FPC portion, and the case member includes an FPC holding portion that covers and holds connection locations between the FPC portion of the image element and other members. In this case, it is possible to reliably protect the FPC portion.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a description will be made of a virtual image display apparatus according to a first embodiment of the invention with reference to FIG. 1 and the like.

Figure 1:
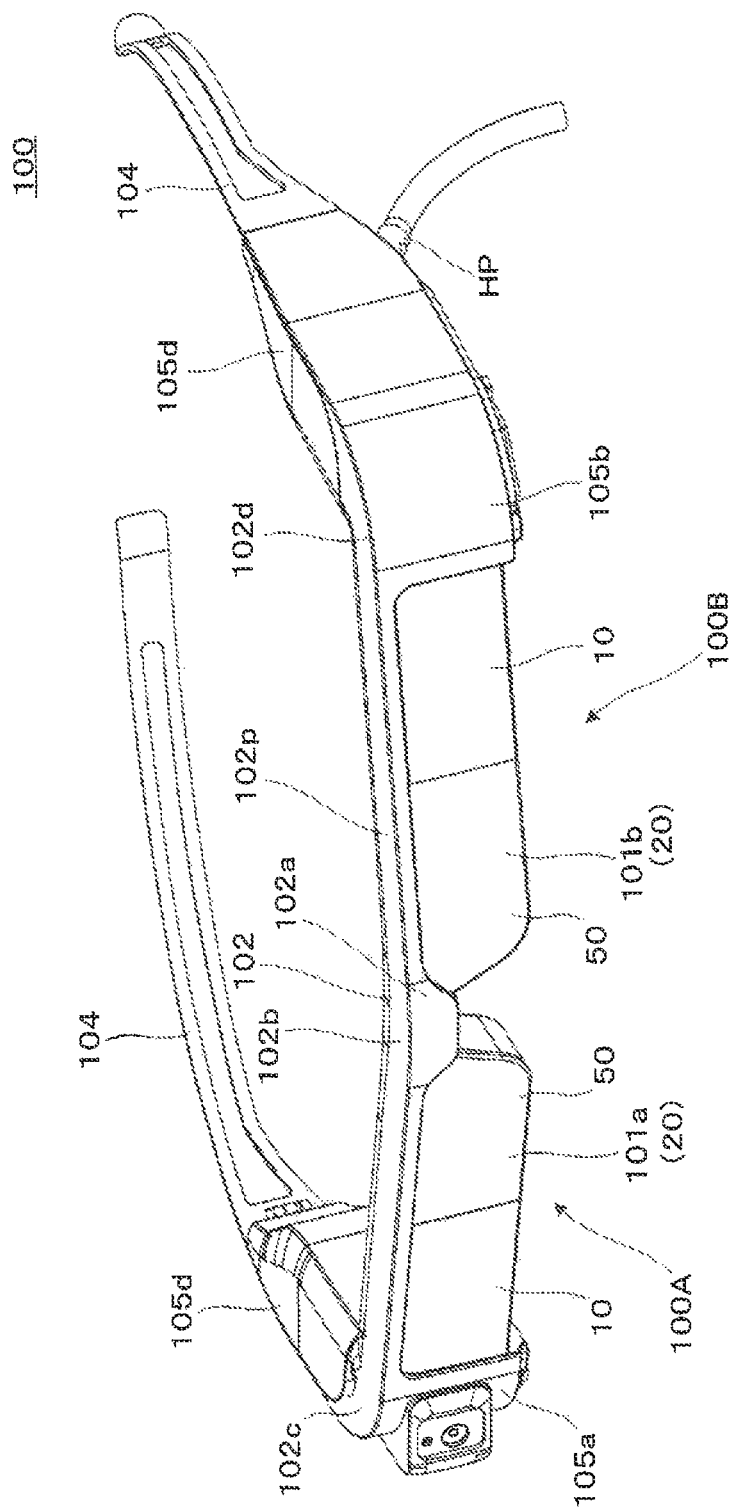
FIG. 1 is a perspective view for explaining an exemplary exterior of a virtual image display apparatus according to a first embodiment.

As illustrated in FIG. 1, a virtual image display apparatus 100 of the present embodiment is a head mounted display (HMD) having an exterior like spectacles, and an observer or a user wearing the virtual image display apparatus 100 can visually recognize image light (video light) based on a virtual image and can also visually recognize or observe an external image in a see-through manner. The virtual image display apparatus 100 includes a first display device 100A, a second display device 100B, and a frame 102.

The first display device 100A and the second display device 100B are respectively elements forming a right eye virtual image and a left eye virtual image, and respectively include first and second optical members 101a and 101b which cover the eyes of the observer in a see-through manner, and first and second image forming main bodies 105a and 105b. As will be described later, each of the first and second image forming main body 105a and 105b is formed of a display device (image element) or an optical system for forming an image, such as a projection lens, a member storing the optical system, and the like. The display device (image element) or the projection lens is covered with a cover-like outer member 105d so as to be supported and stored. The first and second optical members 101a and 101b are light guide portions which guide video light formed by the first and second image forming main bodies 105a and 105b and allow external light and the video light to be visually recognized in an overlapping manner, and a light guide device is formed of the first and second optical members 101a and 101b. Hereinafter, the first optical member 101a or second optical member 101b will also be referred to as a light guide device 20. Each of the first display device 100A and the second display device 100B also functions as a virtual image display apparatus alone.

The frame 102 is an elongated member which is bent in a U shape in a plan view, and is a metallic integrated component. Here, as an example, the frame 102 is formed of a main body portion 102p including a magnesium frame (magnesium alloy) which is a metallic integrated component. As illustrated, the frame 102 includes a central portion 102a having a thick structure which is provided to be connected to both of the first optical member 101a and the second optical member 101b (the light guide devices 20 as a pair of light guide portions), and a support body 102b which extends along the first and second optical members 101a and 101b from the central portion 102a and forms a location bent in a U shape.

The central portion 102a is interposed between front end sides of the first and second optical members 101a and 101b so as to fix relative positions thereof. The support body 102b forms first and second peripheral portions 102c and 102d which are portions bent in a U shape, and is connected to the first and second optical members 101a and 101b at the first and second peripheral portions 102c and 102d.

Temples 104 which are string portions extending backward from both of left and right ends of the frame 102 are provided, and may be used to support the virtual image display apparatus 100 by being brought into contact with the ears or the temples of the observer.

Figure 2:
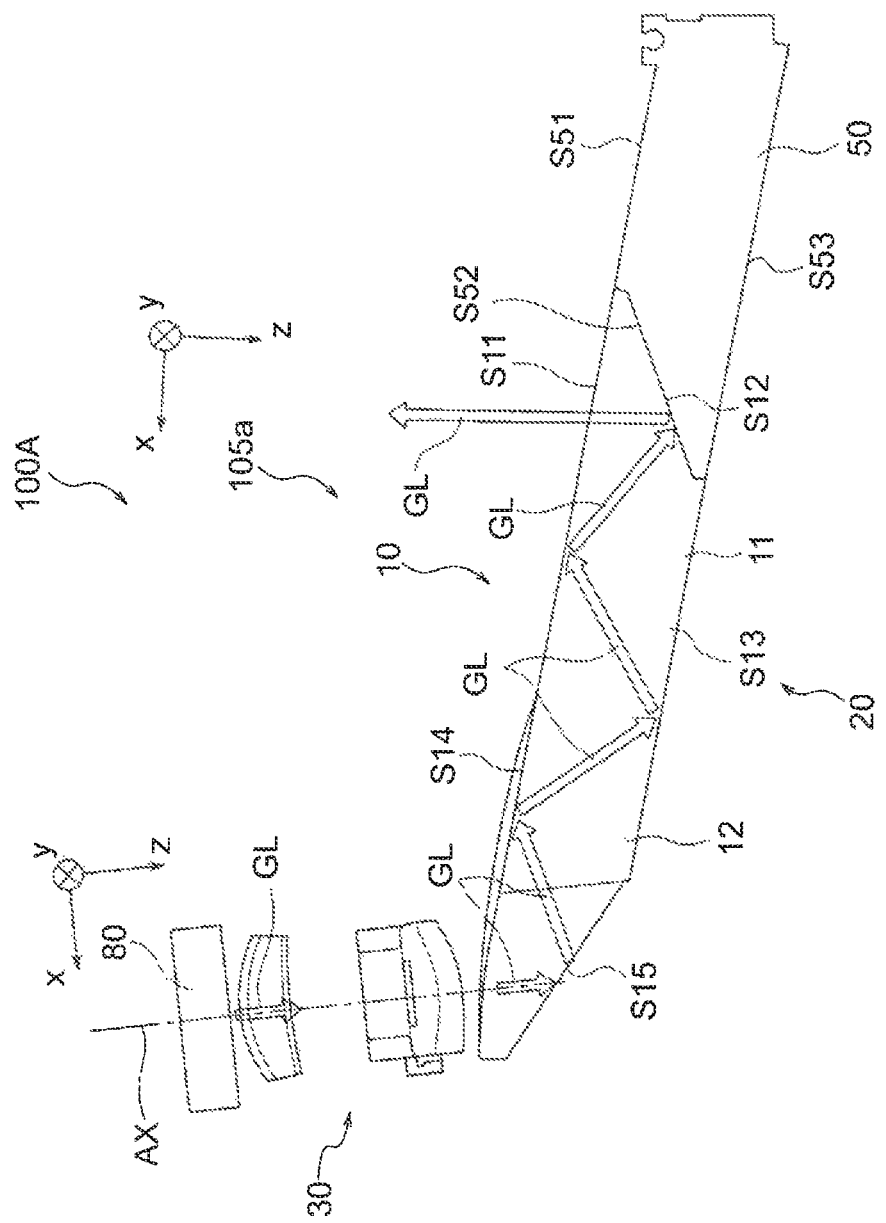
FIG. 2 is a diagram for conceptually explaining an optical path of video light.
Figure 3:
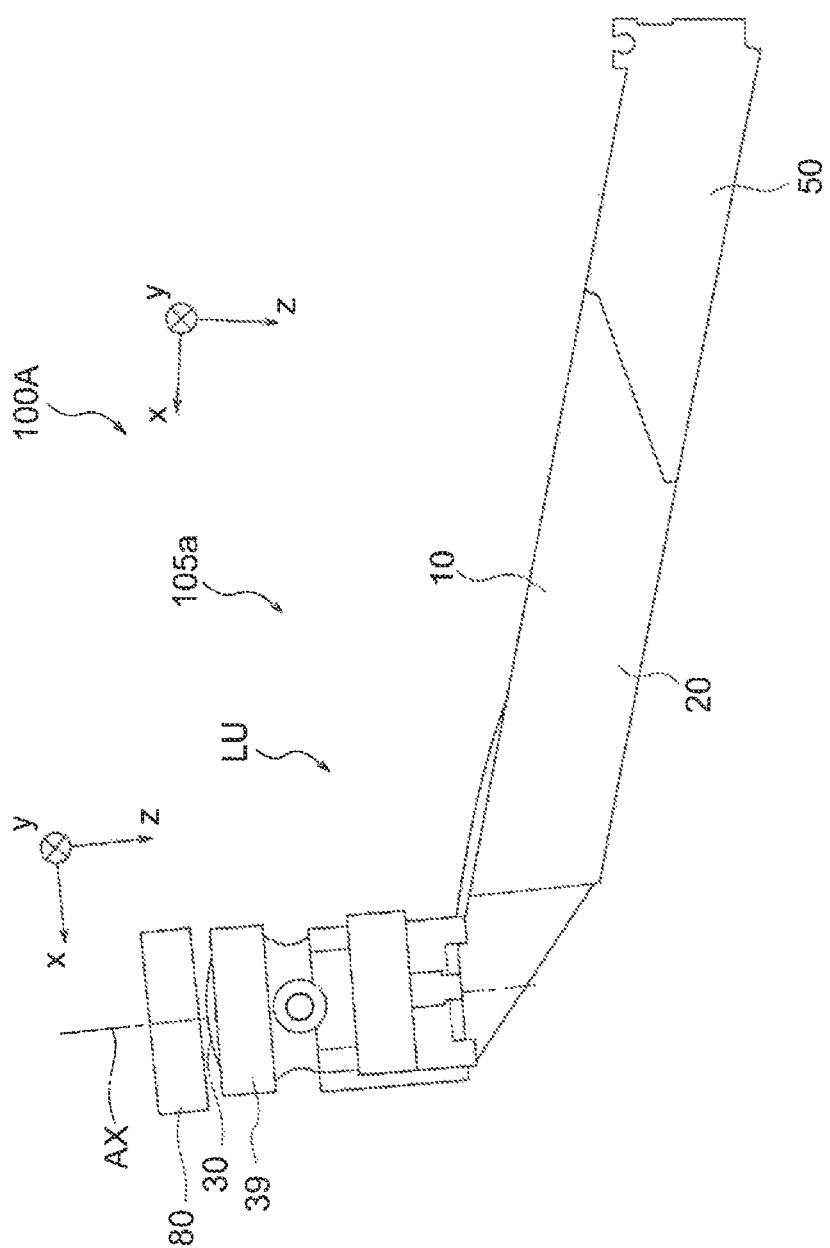
FIG. 3 is a diagram for explaining that an optical system is held by an optical component holding member.

Hereinafter, with reference to FIGS. 2 and 3, a description will be made of conceptual examples of a structure and the like for guiding video light in the virtual image display apparatus 100. Devices guiding video light are the first display device 100A and the second display device 100B (refer to FIG. 1 or the like) as described above, but the first display device 100A and the second display device 100B have horizontally symmetrical and the same structure, and thus the only first display device 100A will be described, and a description of the second display device 100B will be omitted. As illustrated in FIG. 2, the first display device 100A includes an image display device 80 which forms video light, an image forming projection lens 30 which is stored in a lens barrel portion, and the light guide device 20 (first optical member 101a) which guides the video light which has passed through the image display device 80 and the projection lens 30. The light guide device 20 is formed of a light guiding and see-through light guide member 10 and a see-through light transmissive member 50.

The image display device 80 may be a image element (video display element) formed of, for example, a self-emitting element such as an organic EL element. The image display device 80 may be configured to include, for example, not only a video display element (image element) which is a transmissive spatial light modulation device, but also a driving controller (not illustrated) which controls an operation of an illumination device (not illustrated) which is a backlight emitting illumination light to the video display element. As will be described later in detail with reference to FIG. 4 and the like, in the present embodiment, the image display device 80 which is a image element is aligned with an optical system such as the projection lens 30 incorporated into a holding member which will be described later in a state of being stored in a case-like member and being thus configured as a unit (module). A unit (module) in which the image display device (image element) 80 is stored in a case is referred to as a display device unit (or a image element unit).

The projection lens 30 is a projection optical system including, for example, a plurality of (for example, three) optical elements (lenses) arranged in the direction of the incidence side optical axis AX (optical axis direction; a z direction) extending as constituent elements, and the optical components (optical elements or lenses) are stored and supported in an optical component holding member 39 (refer to FIG. 3 or the like) which is a lens barrel portion. Each of the optical elements is formed of, for example, an aspherical lens including an axisymmetric aspherical surface and a non-axisymmetric aspherical surface, and can thus form an intermediate image corresponding to a display image in the inside of the light guide member 10 in cooperation with a part of the light guide member 10 forming the light guide device 20. The projection lens 30 projects video light formed by the image display device 80 toward the light guide device 20 so as to cause the video light to be incident thereto.

As described above, the light guide device 20 is formed of the light guiding and see-through light guide member 10 and the see-through light transmissive member 50. The light guide member 10 is a part of the prism type light guide device 20 and is integrally formed therewith, but may be recognized to be divided into a first light guide portion 11 on the light emission side and a second light guide portion 12 on the light incidence side. The light transmissive member 50 is a member (assisting optical block) which assists the light guide member 10 in a see-through function, and is integrally fixed to the light guide member 10 so as to form a single light guide device 20. The light guide device 20 is screwed to, for example, the optical component holding member 39 (refer to FIG. 3 or the like) so as to be positioned and fixed to the projection lens 30 with high accuracy. Here, a component as an integral unit in which the projection lens 30 and the light guide device 20 are attached to the optical component holding member 39 will be referred to as an optical system unit LU.

The light guide member 10 has a first face S11 to a fifth face S15 as side faces having optical functions. Among them, the first face S11 and the fourth face S14 are continuously adjacent to each other, and the third face S13 and the fifth face S15 are continuously adjacent to each other. The second face S12 is disposed between the first face S11 and the third face S13. A half mirror layer is provided associated with a surface of the second face S12. The half mirror layer is a reflective film (that is, a transflective film) having light transmissive property, and is formed by forming a metal reflective film or a dielectric multi-film, and has an appropriate reflectance for video light.

The light transmissive member 50 is integrally fixed to the light guide member 10 so as to form a single light guide device 20 as described above, and is a member (assisting optical block) assisting the light guide member 10 in a see-through function. The light transmissive member 50 has a first transmissive face S51, a second transmissive face S52, and a third transmissive face S53 as side faces having optical functions. The second transmissive face S52 is disposed between the first transmissive face S51 and the third transmissive face S53. The first transmissive face S51 is located on a face extending from the first face S11 of the light guide member 10. The second transmissive face S52 is a curved face joined to and integrated with the second face S12, and the third transmissive face S53 is located on a face extending from the third face S13 of the light guide member 10.

Hereinafter, with reference to FIG. 2, a brief description will be made of an optical path of video light (here, video light GL). First, the video light GL formed by the image display device 80 is projected toward the light guide device 20 by the projection lens 30. In the light guide device 20, the light guide member 10 to which the video light GL from the projection lens 30 is incident guides the video light GL toward the eyes of the observer through reflection at the first face S11 to the fifth face S15. Specifically, first, the video light GL from the projection lens 30 is incident to the fourth face S14 so as to be reflected at the fifth face S15, then incident to the fourth face S14 again from the inside so as to be totally reflected, then incident to the third face S13 so as to be totally reflected, and then incident to the first face S11 so as to be totally reflected. The video light GL which is totally reflected at the first face S11 is incident to the second face S12, so as to be partially transmitted through the half mirror layer provided on the second face S12 and be also partially reflected thereat, and is then incident to the first face S11 again so as to pass therethrough. The video light GL having passed through the first face S11 is incident to the eyes of the observer or positions equivalent thereto as substantially parallel light beams. In other words, the observer observes an image on the basis of the video light as a virtual image.

In the light guide member 10 of the light guide device 20, the third face S13 and the first face S11 are flat faces (diopter of about 0) which are substantially parallel to each other, the third transmissive face S53 and the first transmissive face S51 are flat faces which are substantially parallel to each other, and thus aberration or the like does not occur with respect to external light. The third transmissive face S53 and the first face S11 are flat faces which are substantially parallel to each other, and thus aberration or the like scarcely occurs with respect to external light. As mentioned above, the observer can observe an external image without distortion, that is, can visually recognize or observe the external image in a see-through manner.

The above-described configuration is also the same for the second display device 100B (refer to FIG. 1 and the like). Consequently, images respectively corresponding to the left and right eyes can be formed.

Here, a description will be made of assembling of the optical system having the above-described configuration. As illustrated in FIG. 3, the light guide device 20 which is an optical component forming a light guide optical system and the projection lens 30 which is an optical component forming a projection optical system are positioned and fixed via the optical component holding member 39 with high accuracy. In the above-described configuration, in order for the observer to visually recognize an image at an intended position, the accuracy of alignment of the image display device 80 with respect to the optical system (that is, the optical system unit LU) fixed via the optical component holding member 39 is considerably important. Deviation during assembling of respective optical components or a certain extent of error in optical design due to performance of each optical component inevitably occurs. Thus, in the present embodiment, assembling is performed to have an adjustment margin based on a certain extent of allowance and to take balance between the right and the left in alignment of the image display device 80 with respect to the optical component holding member 39 (optical system unit LU), and thus final images are aligned. Particularly, in a case of the configuration of a pair of the right and the left as in the present embodiment, it is essential to perform highly accurate adjustment in the unit of a pixel so that an image for the right eye side and an image for the left eye side are visually recognized in a state of exactly overlapping each other, and it is considerably important to perform highly accurate alignment between the image display device 80 and the optical system such as the projection lens 30. Specifically, it is necessary to fix a pair of the right and left optical units LU (optical component holding member 39) sides so that images are visually recognized at intended positions in order not to cause horizontal deviation when images based on binocular view are visually recognized, and to maintain the accuracy of alignment of the image display device 80 for each eye. If miniaturization of the apparatus further progresses under such a situation, gaps with other members are reduced, and thus external force (external pressure) is easily received from various directions. Particularly, when the image display device 80 is assembled with the optical component holding member 39, applied external force (external pressure) is easily received, and there is higher concern that deviation may occur. In the virtual image display apparatus 100 according to the present embodiment, a connection structure which is strong against external force can be provided between a display device unit DU configured by storing the image display device 80 in a case member 88 (refer to FIG. 4 and the like) and the optical component holding member 39, that is, the optical system unit LU in which an optical component such as the projection lens 30 is assembled, and miniaturization of the apparatus can be achieved.

Figure 4:
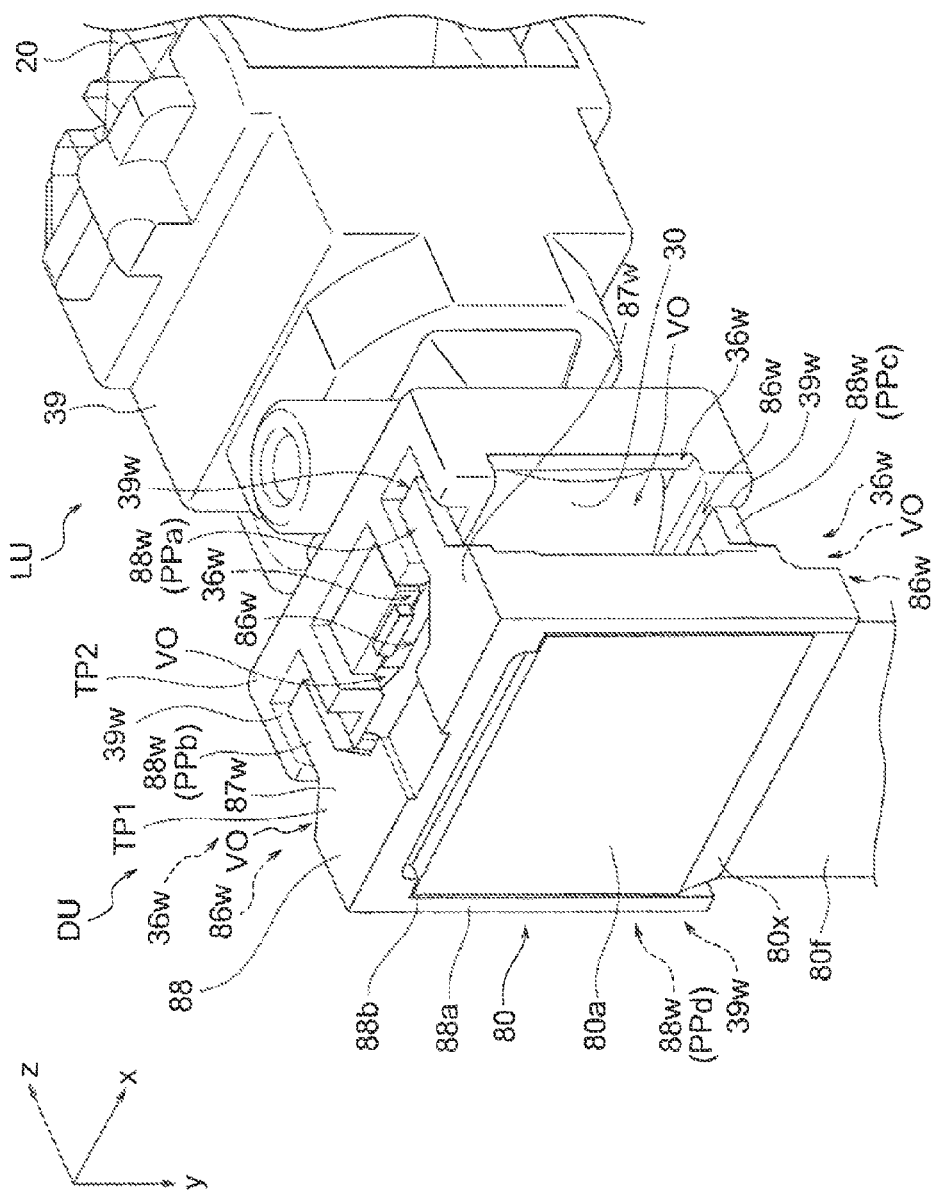
FIG. 4 is a perspective view illustrating a state in which a case member and the optical component holding member are assembled with each other.

Hereinafter, with reference to FIG. 4 and the like, a description will be made of a structure of the display device unit DU which is a image element unit including the image display device (image element) 80 and a structure of the optical component holding member 39 (optical system unit LU). FIG. 4 is a perspective view illustrating a state in which the display device unit DU is assembled with the optical component holding member 39 (optical system unit LU) storing the projection lens 30. In the first display device 100A and the second display device 100B, the display device units DU have horizontally symmetrical and the same structure, and thus only the left side is illustrated in FIG. 4 and will be described, and description and the like of the right side will be omitted.

As illustrated in FIGS. 4 to 8, the display device unit DU is a unit (module) configured by storing the image display device (image element) 80 in the case member 88. In other words, the image display device 80 is stored in the case member 88 which is a case portion through fitting, and is held so as not to be moved. In other words, the case member 88 can be said to be a holding portion (panel holding portion) which holds the image display device 80. Particularly, in the present embodiment, the case member 88 forming the display device unit DU has a frame body structure in which a penetration hole is provided in the central portion as illustrated. The case member 88 has four protruding portions 88w, 88w, . . . which are attachment portions and fitting portions as front end portions at a first end TP1 which is an end on a side joined to the optical component holding member 39 in order to support the frame body structure and to perform attachment alignment with the optical component holding member 39 (refer to FIG. 4). The case member 88 also includes a heat dissipation structure portion 88a forming an opening OP in which a part of the image display device 80 is open, a display device positioning portion (image element positioning portion) 88b which positions and fixes the image display device 80, and a mask portion 88m (refer to FIG. 8) which is provided on a light emission side of video light which is an opposite side to the heat dissipation structure portion 88a or the display device positioning portion 88b and removes unnecessary light from component light emitted from the image display device 80. The case member 88 is manufactured, for example, by injection-molding a resin material. As long as desired shape and structure can be manufactured, the case member 88 may employ, for example, a metallic member with high thermal conductivity, such as aluminum or magnesium, and may thus be a structural body formed of a single member.

Figure 5:
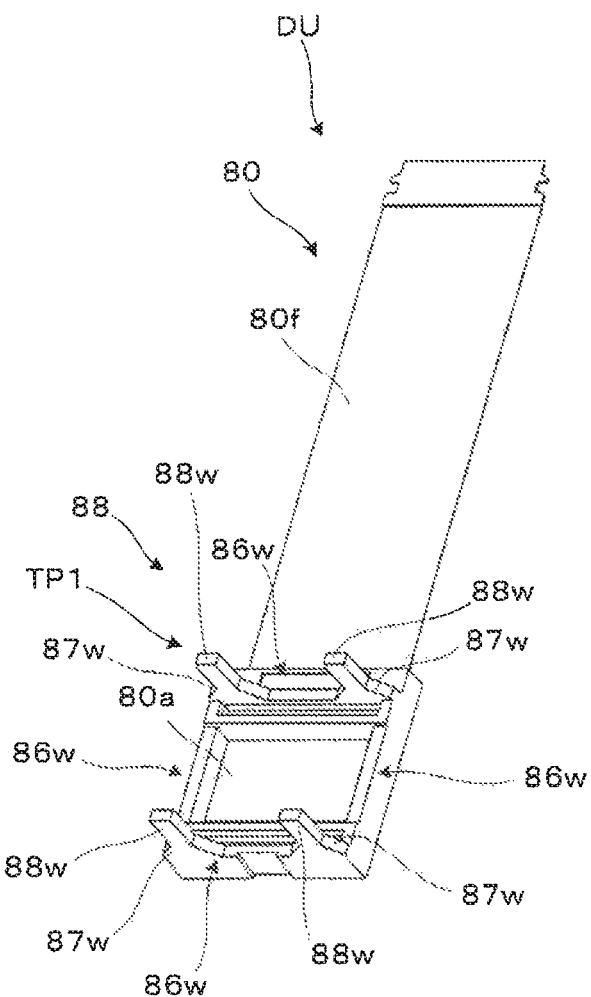
FIG. 5 is a perspective view illustrating an exterior in which a display device unit is viewed from a certain angle.

Hereinafter, in the case member 88, particularly, a shape and a structure of the first end TP1 which is a portion joined to the optical component holding member 39 will be described. For example, as illustrated in FIG. 4 or 5, in the optical component holding member 39, the first end TP1 includes the four protruding portions 88w, 88w, 88w and 88w which are formed in a protruding shape toward the optical component holding member 39 and extend along the optical axis direction (z direction); and four support portions 87w, 87w, 87w and 87w respectively supporting the protruding portions; and first void forming portions 86w, 86w, 86w and 86w which are provided at non-adhesive locations which are not adhered to the optical component holding member 39, and form four voids VO, VO, VO and VO along with the optical component holding member 39 between the optical component holding member 39 and the first void forming portions.

Figure 7:
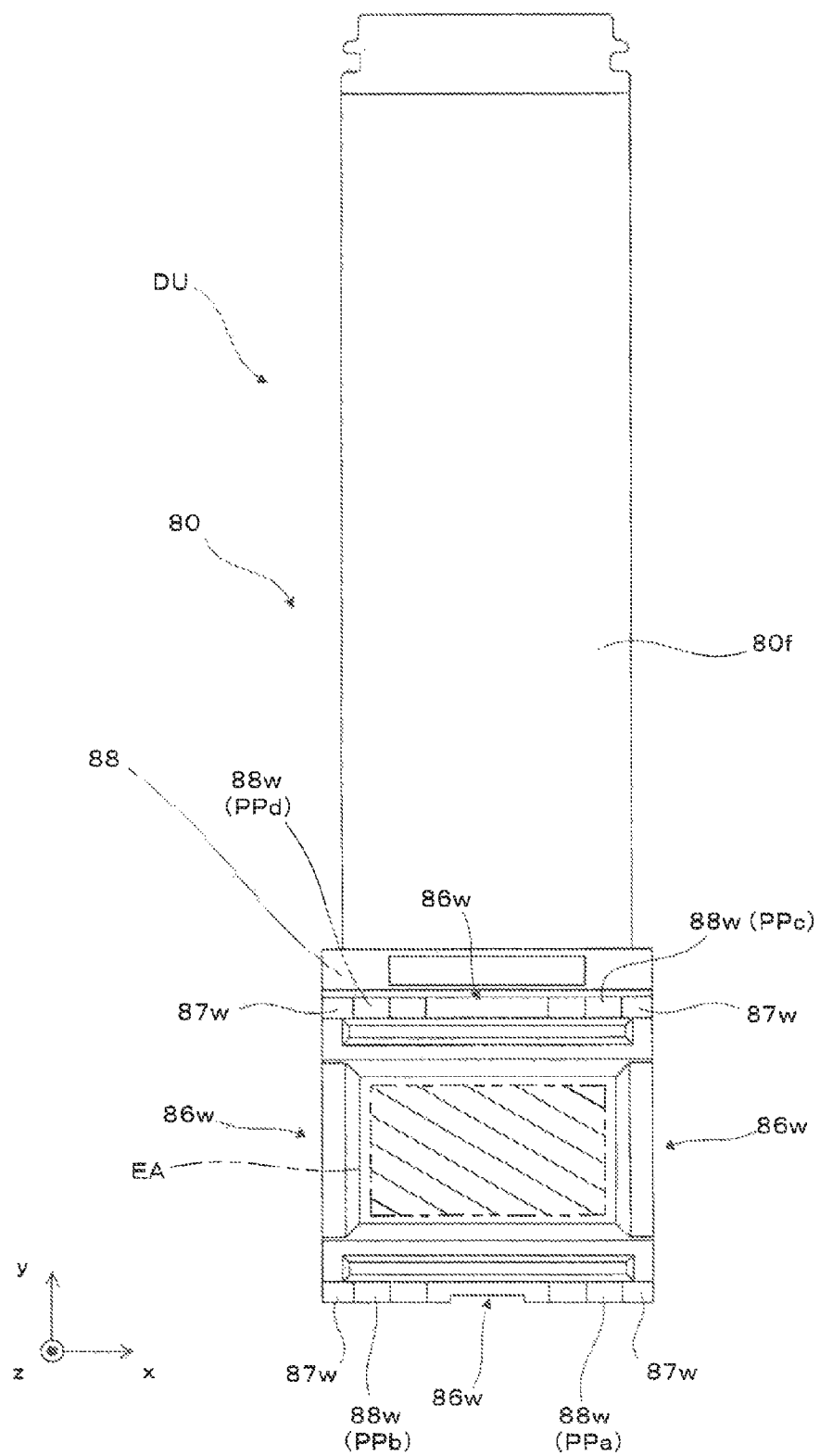
FIG. 7 is a front view of the display device unit.

The four protruding portions 88w, 88w, . . . are disposed to be separated from each other on peripheral sides of edge portions forming ends on the optical component holding member 39 side in the case member 88 having a rectangular frame body structure. More specifically, as illustrated, the four protruding portions 88w, 88w, . . . are respectively disposed at four corners of the case member 88 corresponding to four corners of the image display device 80 and at positions of front end sides on the optical component holding member 39 side, and each protruding portion 88w is a prismatic (square columnar) portion which extends along the optical axis direction (z direction) and forms a front end portion of the first end TP1. Here, the four protruding portions 88w, 88w, . . . are disposed to be symmetrical with respect to the image display device 80 which is a rectangular image element. In this case, for example, as illustrated in FIG. 7, among the four protruding portions 88w, 88w, . . . , a set of protruding portions PPa and PPb are disposed along one side of the image display device 80 in a longitudinal direction (x direction) with respect to a rectangular display region EA (that is, a region from which video light is emitted) of the image display device 80, and another set of protruding portions PPc and PPd are disposed along another side of the image display device 80 in the longitudinal direction (x direction) with respect to the display region EA (that is, a region from which video light is emitted) of the image display device 80. Consequently, the case member 88 and the optical component holding member 39 can be stably and tightly fixed to each other without increasing a length in the longitudinal direction. At least one protruding portion 88w is disposed on an opposite side to two other protruding portions 88w and 88w with the display region EA interposed therebetween. For example, a single protruding portion PPa can be said to be disposed on an opposite side to two other protruding portions PPc and PPd with the display region EA interposed therebetween. Since the four protruding portions 88w, 88w, . . . are disposed in the above-described way, the four protruding portions 88w, 88w, . . . are tightly fixed, and thus a direction of the rectangular display region EA which is a two-dimensional region of the image display device 80 can be fixed in a desired state with respect to the optical axis direction of the projection lens 30 or the like, that is, the incidence side optical axis AX (refer to FIG. 2 or the like).

The four support portions 87w, 87w, . . . are provided further toward the root sides than the four protruding portions 88w, 88w, . . . , and are portions which have larger widths or thicknesses (in other words, thicker than the four protruding portions 88w, 88w, . . . ) in the x direction or the y direction than those of the four protruding portions 88w, 88w, . . . , and thus support the four protruding portions 88w, 88w, . . . . In other words, the first end TP1 has a shape which is thinned stepwise toward the front end side from the root side close to the image display device 80.

The four first void forming portions 86w, 86w, 86w and 86w are provided at portions between the respective protruding portions 88w which are disposed to be separated from each other in the first end TP1 and at non-adhesive locations which are not adhered to the optical component holding member 39, unlike the protruding portions 88w,

88w, . . . . More specifically, the first void forming portion 86w is provided in a U shape by an edge portion from a bridge-like portion between the adjacent support portions 87w and 87w to each of the support portions 87w and 87w. The four first void forming portions 86w, 86w, 86w and 86w respectively form the four voids VO, VO, VO and VO between the first end TP1 and a second end TP2 along with four second void forming portions 36w, 36w, 36w and 36w (refer to FIG. 4 or the like) provided at the second end TP2 of the optical component holding member 39 which will be described later.

In the present embodiment, as illustrated, the case member 88 is provided with the heat dissipation structure portion 88a, and supports and fixes (stores) the image display device 80 in a state in which the opposite side to the location from which video light is emitted is open and exposed in the image display device 80. Consequently, a heat dissipation effect is increased. Although not illustrated, for example, a heat conductive tape may be directly bonded to a portion exposed from the case member 88 in a rear portion of the image display device 80 so as to provide a heat dissipation portion, and thus heat dissipation in the image display device 80 may be prompted. In a case where the above-described so-called self-emitting image display device (image element) 80 is applied to an HMD, and thus a high luminance image is to be formed, the image display device 80 has a structure in which a light emitting source is provided in a panel board, and a driving driver IC, a power supply element, and the like are built thereinto. Thus, an increase in an internal temperature tends to be problematic. Particularly, in a case where an organic EL (OLED) panel is applied to a panel of the image display device (image element) 80 as in the present embodiment, there is concern that performance deterioration or a reduction in the service life may notably occur due to the increase in an internal temperature, with regard to characteristics thereof. In order to handle this problem, efficient heat dissipation can be performed by exposing a part of a silicon (Si) substrate SS forming the image display device 80 in the heat dissipation structure portion 88a of the case member 88, and further providing a heat dissipation portion formed of a heat conductive tape as necessary. In the above-described configuration, it is possible to improve assembling position accuracy of the case member 88 and the image display device 80 by using an end surface of the silicon substrate SS of the image display device 80.

Figure 6:
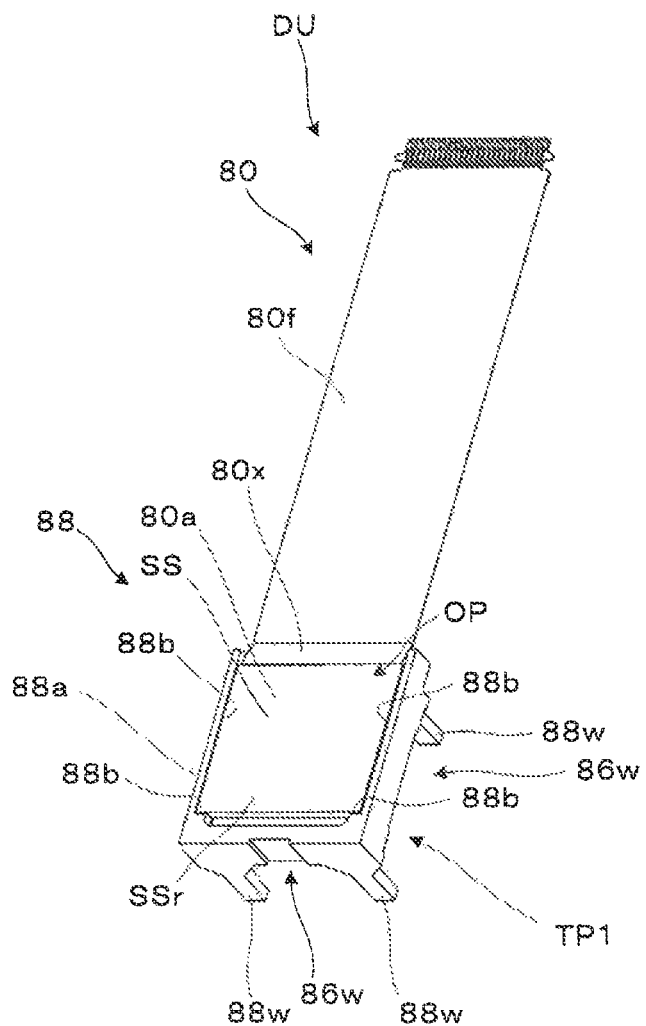
FIG. 6 is a perspective view illustrating an exterior in which a display device unit is viewed from another angle.

Hereinafter, a description will be made of details of a structure of the image display device 80 in the display device unit DU. As illustrated, the image display device 80 includes a rectangular tabular main body portion 80a stored in the case member 88, and a flexible printed circuit (FPC) portion 80f which is connected to and extends from the main body portion 80a. Above all, the main body portion 80a includes, as illustrated in FIGS. 5 to 7, the silicon substrate SS on which various circuits are disposed and which forms an appearance of the main body portion 80a; a light emitting portion 80k which is an organic EL element configured to include an organic EL material and generates color light which will become video light; and a protection glass GG for sealing which seals the light emitting portion 80k along with the silicon substrate SS. The image display device 80 performs a light emission operation in response to a drive signal received from the FPC portion 80f, and thus emits video light toward the protection glass GG side, that is, the +z side. As illustrated, the image display device 80 is stored in the case member 88 in a state of a part of the main body portion 80a being exposed. More specifically, the image display device 80 is supported and fixed in a state of the entire rear surface SSr of the silicon substrate SS disposed on the opposite side to the location from which video light is emitted being exposed.

Here, as described above, in the present embodiment, regarding a configuration of the image display device 80, the silicon (Si) substrate is employed as a self-emitting type element substrate mounted with an organic EL element (OLED). Consequently, first, high thermal conductivity can be provided in relation to the above-described heat dissipation, and thus highly efficient heat dissipation can be performed. In creation of a circuit board for configuring a light emitting element, a circuit having a fine configuration, that is, a more minute structure (for example, in the unit of several microns) can be formed. Since the silicon substrate forms an appearance of the image display device 80, each end surface of the silicon substrate is cut with high accuracy by using an accurate height (for example, within several tens of μ in terms of manufacturing error) in silicon dicing, so as to be used for positioning when the image display device 80 is stored in the case member 88, and thus position accuracy with respect to the case member 88 can be heightened (for example, much higher than that of a surface of the protection glass GG). Since the case member 88 aligns the display device unit DU having the image display device 80 built thereinto with the optical component holding member 39 storing the projection lens 30, the accurate height is maintained in the display device unit, and, as a result, position accuracy of the image display device 80 with respect to the projection lens 30 can be maintained in a high state.

Figure 8:
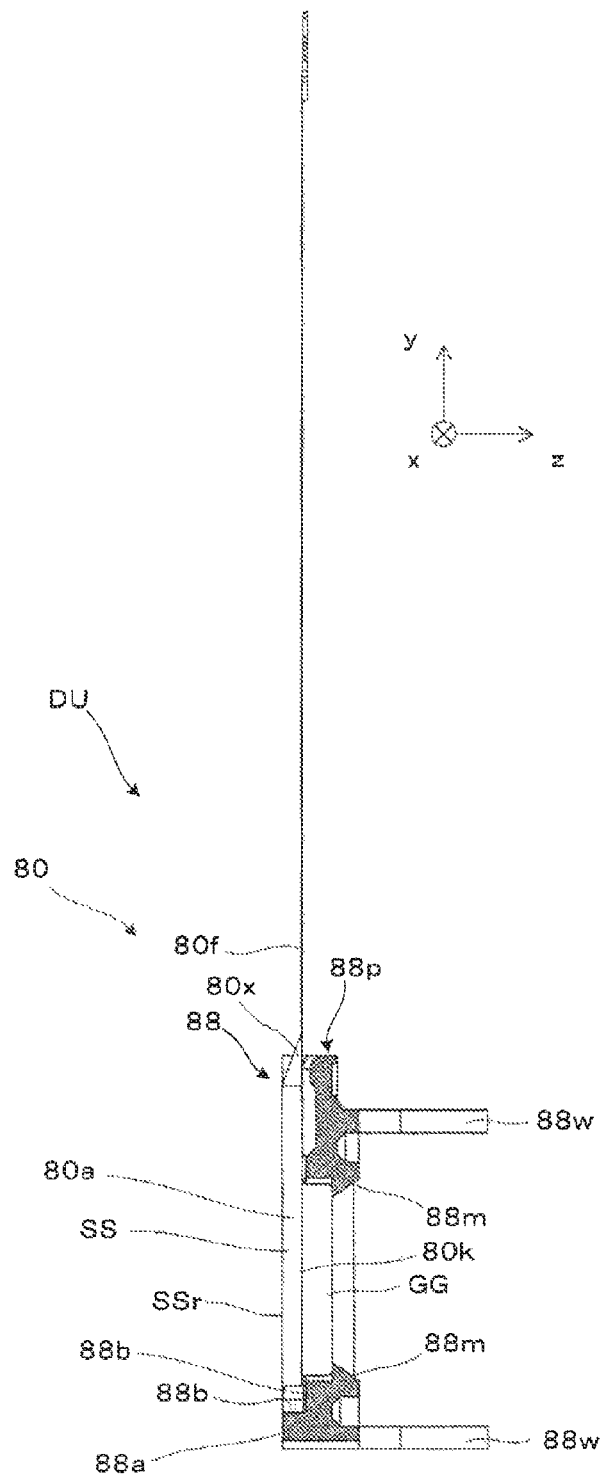
FIG. 8 is a side sectional view of the display device unit.

For example, as illustrated in FIG. 8, in the image display device 80, the FPC portion 80f is connected to an end of the main body portion 80a which is a display element, and the connection location is covered with an FPC holding portion 88p which is a part of the case member 88. In other words, the case member 88 includes the FPC holding portion 88p provided to cover the end of the FPC portion 80f or the connection location between the FPC portion 80f and the main body portion 80a at the location where the FPC portion 80f extends from the end of the main body portion 80a. The image display device 80 includes a protruding portion 80x which extends to protrude toward the location where the FPC portion 80f extends on the rear surface side of the FPC portion 80f at the end of the main body portion 80a of the image display device 80, and the FPC portion 80f is interposed between the protruding portion 80x and the FPC holding portion 88p. Consequently, the connection location between the FPC portion 80f and the main body portion 80a can be protected, and unexpected disconnection is not made to occur in the FPC portion 80f. The protruding portion 80x may be formed of, for example, an adhesive, and may be formed of the silicon substrate SS by lengthening a part of the silicon substrate SS. A fixation adhesive may be applied around the FPC holding portion 88p or the protruding portion 80x so that the respective portions including the main body portion 80a are fixed.

Figure 9:
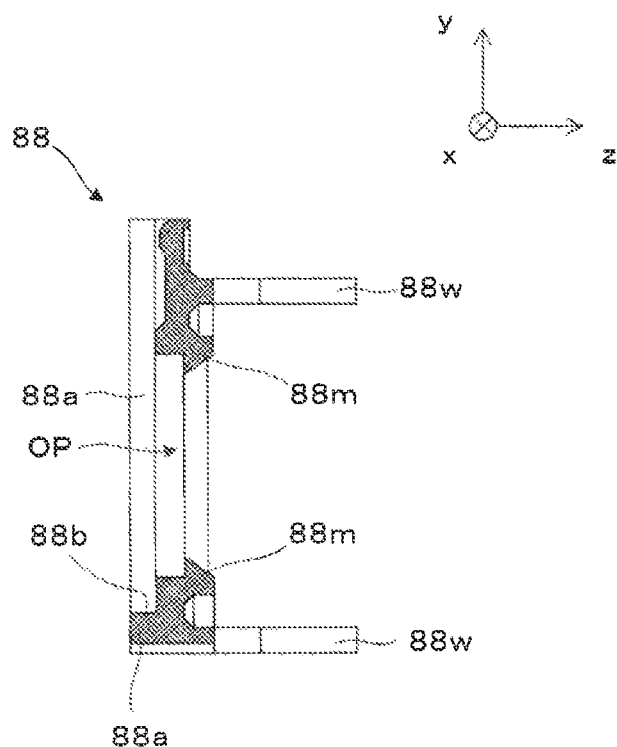
FIG. 9 is a side sectional view of the case member in the display device unit.

For example, as illustrated in FIG. 9, the heat dissipation structure portion 88a of the case member 88 is formed as a groove portion having a U shape which is open toward the +y side on the rear surface side (the opposite side to the location from which video light is emitted), that is, the −z side in the figure, and is a portion into which the main body portion 80a of the image display device 80 is inserted.

Hereinafter, referring to FIG. 4 again, a description will be made of a structure of the optical component holding member 39. Here, in the optical component holding member 39, particularly, a shape and a structure of the second end TP2 which is an end on the side joined to the case member 88 will be described. As illustrated, in the optical component holding member 39, the second end TP2 has four grooves 39w, 39w, 39w and 39w formed in a depression shape so as to respectively correspond to the four protruding portions 88w, 88w, 88w and 88w of the case member 88 and extend along the optical axis direction (z direction); and the second void forming portions 36w, 36w, 36w and 36w forming the four voids VO, VO, VO and VO along with the optical component holding member 39 between the case member 88 and the second void forming portions. Each second void forming portion 36w is provided at a portion between the respective grooves 39w disposed to be separated from each other in the second end TP2 and at a non-adhesive location which is not adhered to the case member 88. More specifically, the second void forming portion 36w is provided in a linear shape by edges of the grooves 39w and 39w, and forms, for example, a semicircular void VO along with the corresponding first void forming portion 86w.

Figure 10:
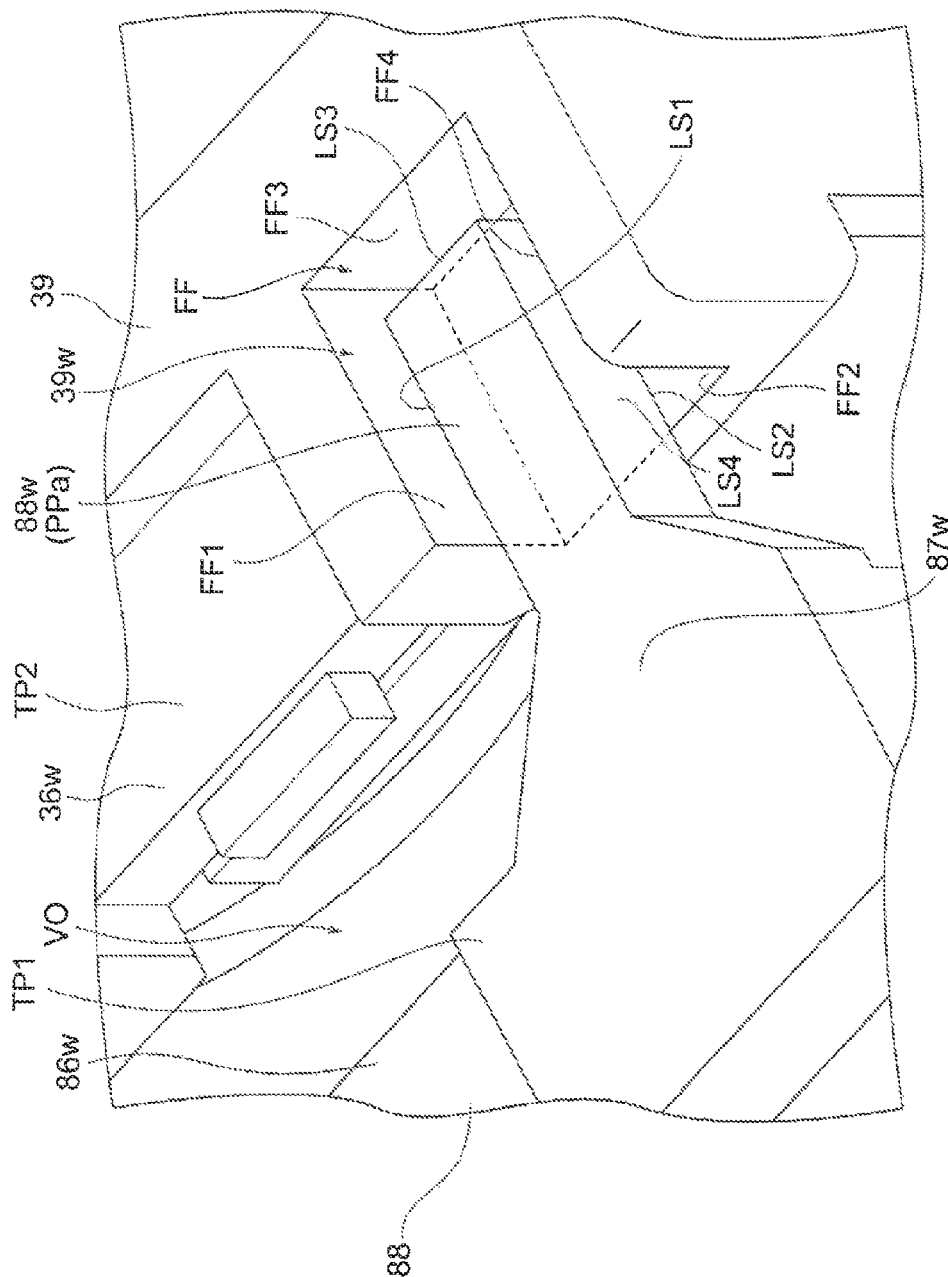
FIG. 10 is an enlarged perspective view of an adhesive location between a first end portion of the case member and a second end portion of the optical component holding member.

The four grooves 39w, 39w, . . . are respectively provided at positions corresponding to the four corners of the case member 88 in the optical component holding member 39, so as to correspond to the four protruding portions 88w, 88w, . . . . Particularly, in an example described in the present embodiment, as an enlarged part (a set of the groove and the protruding portion) is illustrated in FIG. 10, each groove 39w has a wall surface portion FF formed of four flat surfaces FF1 to FF4 in accordance with the shape of each protruding portion 88w which is a prismatic (square columnar) front end portion of the first end TP1. More specifically, as illustrated, the four flat surfaces FF1 to FF4 respectively face outer surfaces LS1 to LS4 of each square columnar protruding portion 88w. Among the flat surfaces FF1 to FF4, the first flat surface FF1 is directed in the horizontal direction (+x direction), that is, a flat surface having the horizontal direction (x direction) as a normal direction. The second flat surface FF2 is directed in the upper direction (+y direction), that is, a flat surface having the upper direction (y direction) as a normal direction. The third flat surface FF3 is directed in the optical axis direction (−z direction), that is, a flat surface having the optical axis direction (z direction) as a normal direction. The fourth flat surface FF4 is a flat surface facing the first flat surface FF1 and is directed in the horizontal direction (−x direction), that is, a flat surface having the horizontal direction (x direction) as a normal direction. The flat surfaces FF1 to FF4 are tightly fixed in a state of being close to the outer surfaces LS1 to LS4 of each square columnar protruding portion 88w. Therefore, a joint state between the case member 88 and the optical component holding member 39 can be made strong to the extent of resisting against external force applied from various directions. In other words, in the case of the above-described configuration, the first flat surface FF1 to the third flat surface FF3 are respectively directed in three directions (the x direction, the y direction, and the z direction) which are orthogonal to each other, and thus a structure which is strong against external force applied from the three directions can be provided. Among them, for example, the first flat surface FF1 and the second flat surface FF2 face directions (the x direction and the y direction) which are perpendicular to the optical axis direction (z direction), that is, directions directed toward the central side with respect to a light emission direction of the panel surface which is a video light emission surface. Since the intensity can be increased in such directions, there can be provided a structure of strongly preventing positional deviation against external force not only in the vertical direction (y direction) but also in the horizontal direction (x direction), that is, the leftward-and-rightward direction.

As described above, a fixation location between the first end TP1 and the second end TP2 is formed of the columnar protruding portions 88w, 88w, . . . and the grooves 39w, 39w, . . . having the shape corresponding thereto, and thus the fixation location can be formed in a dot shape (or a linear shape). Particularly, in the above-described configuration, at least one of the surface on the +y side or the surface on the −y side is exposed (in FIG. 10, the surface on the −y side is exposed as can be seen from corresponding FIG. 4). Therefore, in a case where fixation is performed by using, for example, an ultraviolet curable resin, an intervening adhesive in the x direction and the y direction is exposed in the fixation location, and thus ultraviolet light can be thoroughly applied to the adhesive. An intervening adhesive in the y direction is shaded by the protruding portion 88w during irradiation, but, for example, a width of the protruding portion is about 1 to 2 mm so as to be sufficiently small, and thus ultraviolet light can be thoroughly applied to the adhesive. As mentioned above, in the present embodiment, the ultraviolet curable resin can be irradiated with ultraviolet light over the entire fixation location, and thus fixation can be reliably performed in a short period of time. For example, in a case where an adhesive is two-dimensionally applied to a pair of tabular members and is cured, it cannot be said that ultraviolet light is sufficiently applied to a central side of a surface, and thus adhesion may be insufficiently performed, but, in a case of the configuration of the present embodiment, this situation can be prevented, and the adhesive can be reliably cured in a short period of time. The protruding portion 88w has the shape and the structure of extending in the optical axis direction, and thus the apparatus can be miniaturized.

Hereinafter, with reference to FIG. 11, a description will be made of assembling of the case member 88 and the optical component holding member 39 (assembling of the first end TP1 and the second end TP2).

First, as shown in step A, the case member 88 (that is, the display device unit DU) and the optical component holding member 39 (that is, the optical system unit LU) are prepared (preparation step). Here, it is assumed that the optical component holding member 39 is fixed, and the case member 88 and the optical component holding member 39 are attached to jigs (not illustrated) so that a position of the case member 88 can be adjusted in six-axis directions with respect to the optical component holding member 39. Next, as shown in step B, in the optical component holding member 39, an adhesive AH fills each groove 39w of the second end TP2. In other words, each groove 39w is buried with the adhesive AH (adhesive filling step). Here, an ultraviolet curable resin is used as the adhesive AH. Next, as shown in step C, the case member 88 is moved to the optical component holding member 39 side so that each corresponding protruding portion 88w is inserted into each groove 39w filled with the adhesive AH, and alignment (six-axis alignment) regarding rotation axes in three directions is performed in addition to the three directions including an upward-and-downward direction, a leftward-and-rightward direction, and a front-and-rear direction (alignment step). Next, as shown in step D, the adhesive AH is irradiated with ultraviolet light UV, and thus the adhesive AH is cured so as to form an adhesive portion AP. Therefore, the case member 88 is fixed to the optical component holding member 39, that is, the protruding portion 88w of the first end TP1 is fixed to the groove 39w of the second end TP2 (fixation step). At this time, the void VO is formed by the void forming portions 86w and 36w. Finally, assembling of other components or removal of refuse of the joint location or a periphery thereof using the void VO is performed as necessary, and, then, as shown in step E, a tape-shaped sealing member SL seals the void VO (sealing step).

Figure 12:
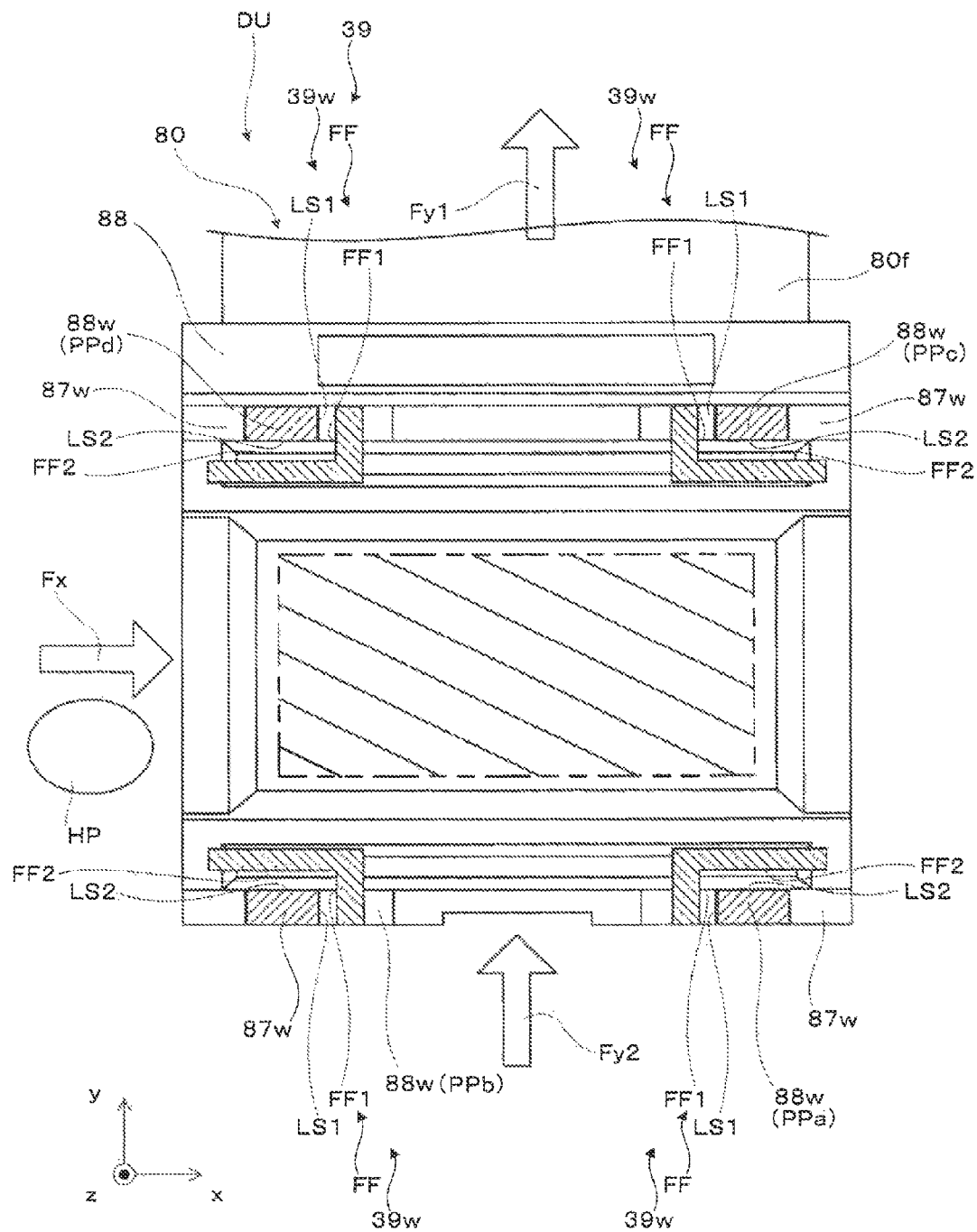
FIG. 12 is a diagram for explaining a relationship between a flat surface portion and a protruding portion in a groove.
Figure 13:
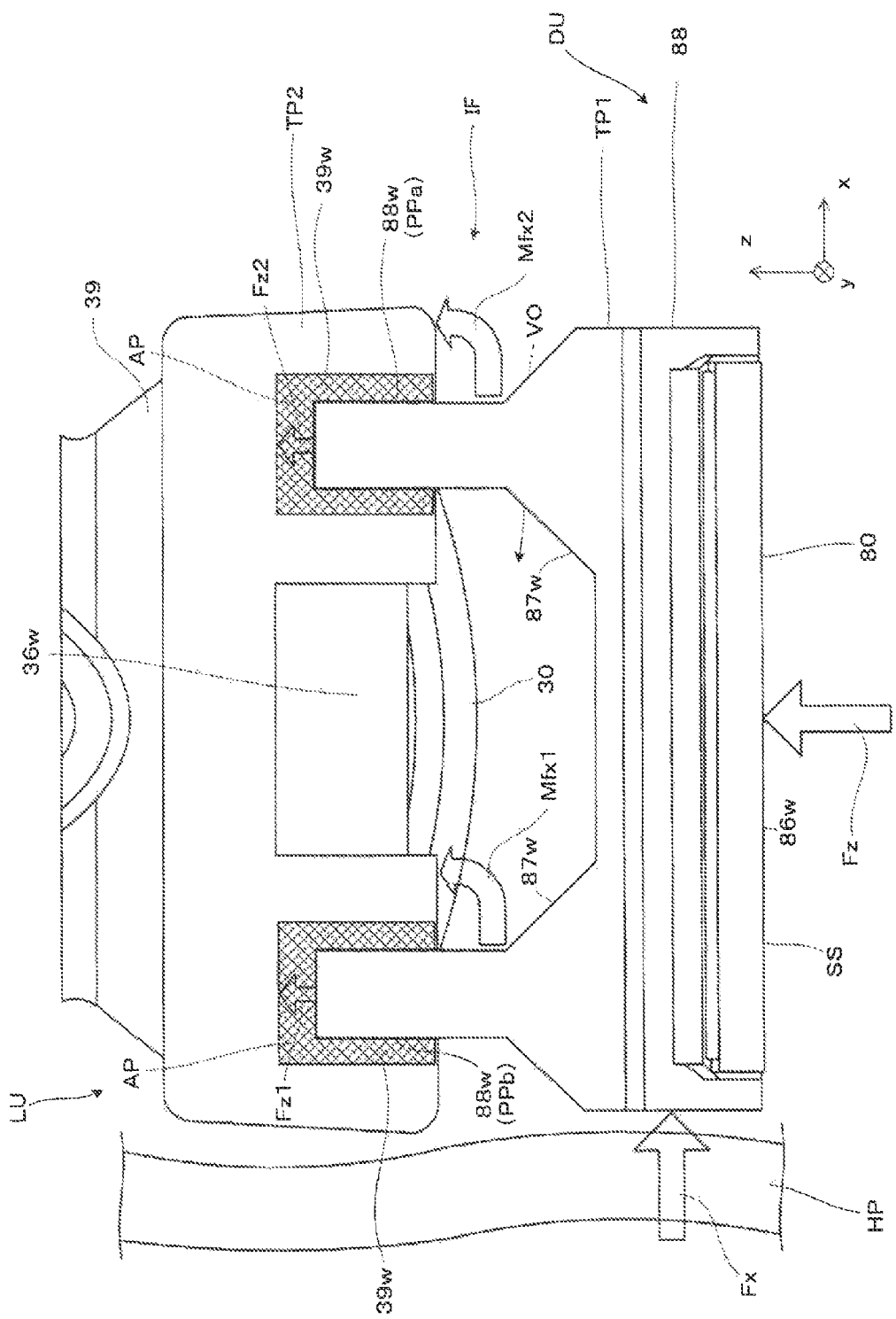
FIG. 13 is a plan view for explaining external force applied to the protruding portion.
Figure 14:
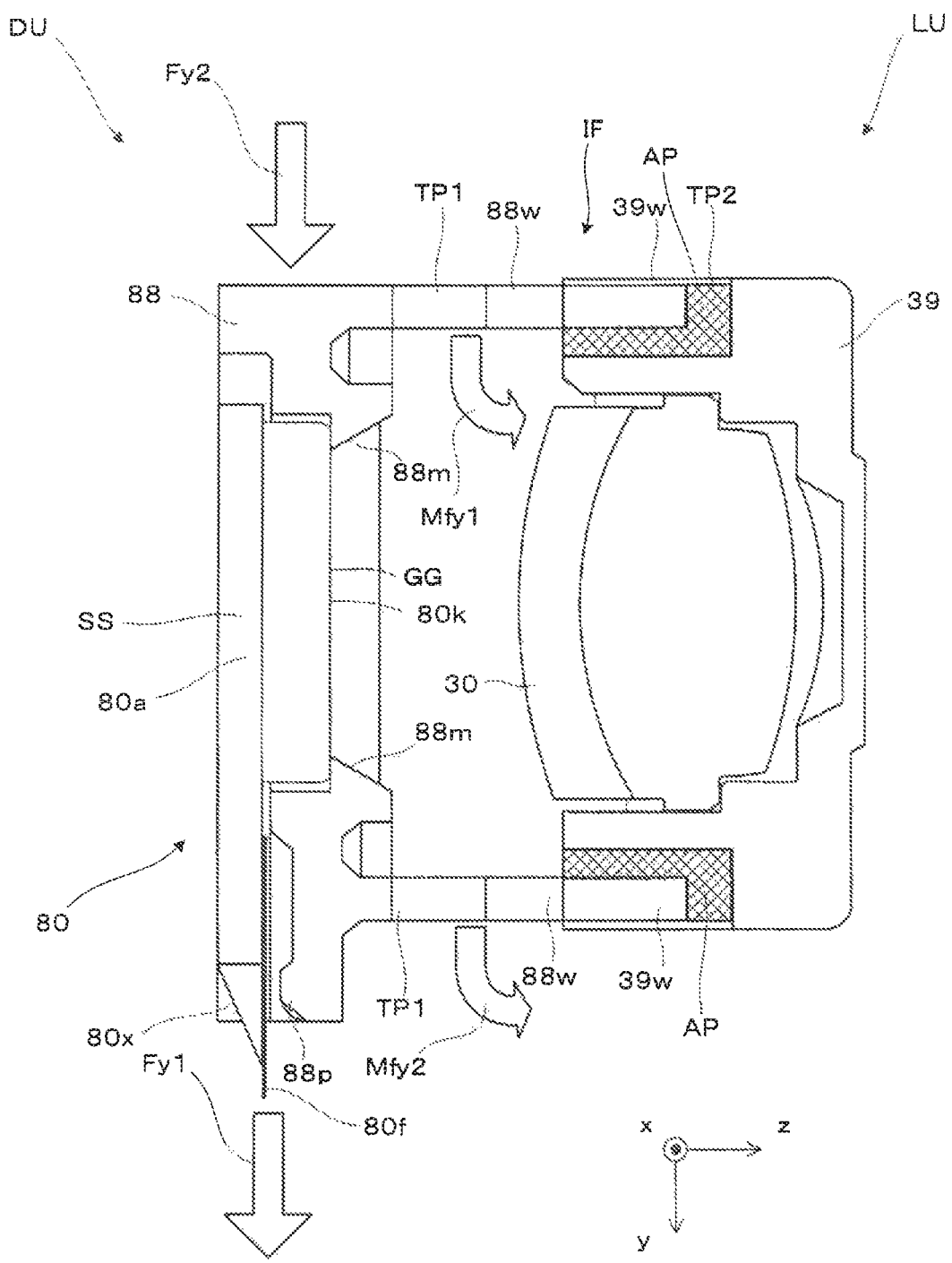
FIG. 14 is a side view for explaining external force applied to the protruding portion.

Hereinafter, with reference to FIGS. 12 to 14, a detailed description will be made of characteristics of a joint state in a joint portion IF between the case member 88 and the optical component holding member 39 (between the first end TP1 and the second end TP2), action applied to the joint portion IF, and the like. For example, as illustrated in FIGS. 12 and 13, if external pressure (external force) Fx is applied to the display device unit DU in the horizontal direction (x direction), moments Mfx1 and Mfx2 may be generated in the protruding portions PPa and PPb among the protruding portions 88w. In this case, the same action also occurs in the remaining protruding portions PPc and PPd. This may occur, for example, as illustrated, in a case where a harness member HP is disposed to pass near a horizontal side of the case member 88 during assembling. In other words, if the harness member HP is disposed to be biased toward the lateral side near the first end TP1 and the second end TP2 (in the cases of FIGS. 12 and 13, the harness member HP can be said to be biased to the left (−X side)), for example, during assembling, the external force Fx may be applied from a direction (x direction) which is perpendicular to the connection direction (z direction) of the first end TP1 and the second end TP2. Even in this case, as described above, since the four protruding portions 88w, 88w, . . . are attached and fixed in a state in which the wall surface portions FF of the grooves 39w are filled with the adhesive AH, the first flat surface FF1 and the outer surface LS1 (and the fourth flat surface FF4 and the outer surface LS4) are two-dimensionally fixed to each other in the horizontal direction (x direction), and thus a configuration which is sufficient to maintain the joint state with respect to the moments Mfx1 and Mfx2 is formed. For example, as illustrated in FIGS. 12 and 14, if external pressure (external force) Fy1 or external pressure (external force) Fy2 is applied to the display device unit DU from the upward direction or the downward direction (y direction), moments Mfy1 and Mfy2 may be generated in the protruding portions 88w. This may occur, for example, as illustrated, in a case where tensile force works on the FPC portion 80f disposed near the lower side of the case member 88 during assembling, and thus the external pressure (external force) Fy1 is applied. It can also be said that the FPC portion 80f is disposed to be biased to the lateral side near the first end TP1 and the second end TP2, and thus the external force Fy1 may be applied due to this arrangement. Even in this case, in the same manner as described above, the second flat surface FF2 and the outer surface LS2 are two-dimensionally fixed to each other in the vertical direction (y direction), and thus a configuration which is sufficient to maintain the joint state with respect to the moments Mfy1 and Mfy2 is formed. For example, as illustrated in FIG. 13, if external pressure (external force) Fz is applied to the display device unit DU from the optical axis direction (z direction), external forces Fz1 and Fz2 may be generated in the protruding portions 88w. Even in this case, in the same manner as described above, the third flat surface FF3 and the outer surface LS3 are two-dimensionally fixed to each other in the optical axis direction (z direction), and thus a configuration which is sufficient to maintain the joint state with respect to the external forces Fz1 and Fz2 is formed. In the above-described case, the four protruding portions 88w, 88w, . . . are provided at four corners of the case member 88, and, thus, for example, two protruding portions 88w and 88w are linearly arranged and separated from each other in the horizontal direction (x direction). Consequently, for example, the influence of the external pressure (external force) Fx illustrated in FIG. 13 is distributed, and, especially, the moment Mfx1 working at a position relatively close to a location on which the external pressure (external force) Fx works is relatively reduced. Therefore, it can be said that the rigidity is further increased. This is also the same for the vertical direction (y direction).

In the above-described case, the four protruding portions 88w, 88w, . . . are disposed symmetrically with respect to the image display device 80. In this case, image display devices for the right eye and the left eye can be manufactured in the same shape.

In the above-described configuration, the fourth flat surface FF4 is provided on the outside of the groove 39w, and thus there is a structure in which the applied adhesive AH hardly overflows outward. However, in a case where there is no concern that the adhesive overflows or there is no problem in the rigidity, the fourth flat surface FF4 may not be provided.

As described above, in the virtual image display apparatus 100 according to the present embodiment, of the case member 88 and the optical component holding member 39, the four protruding portions 88w, 88w, . . . are provided at the first end TP1 of the case member 88, and the four grooves 39w, 39w, . . . are provided at the second end TP2 of the optical component holding member 39, and these are fixed to each other at the adhesive portions AP. In other words, three or more fixation locations are provided, and thus it is possible to form a structure which is strong against external force from various directions such as a vertical direction or a horizontal direction. The protruding portion 88w structurally extends along the optical axis direction, and thus the apparatus can be miniaturized.

Second Embodiment

Hereinafter, with reference to FIG. 15, a virtual image display apparatus according to a second embodiment will be described. The virtual image display apparatus according to the second embodiment is obtained by partially changing the virtual image display apparatus of the first embodiment, and FIG. 15 corresponds to FIG. 13. Portions which are not particularly mentioned are the same as those in the first embodiment.

Figure 15:
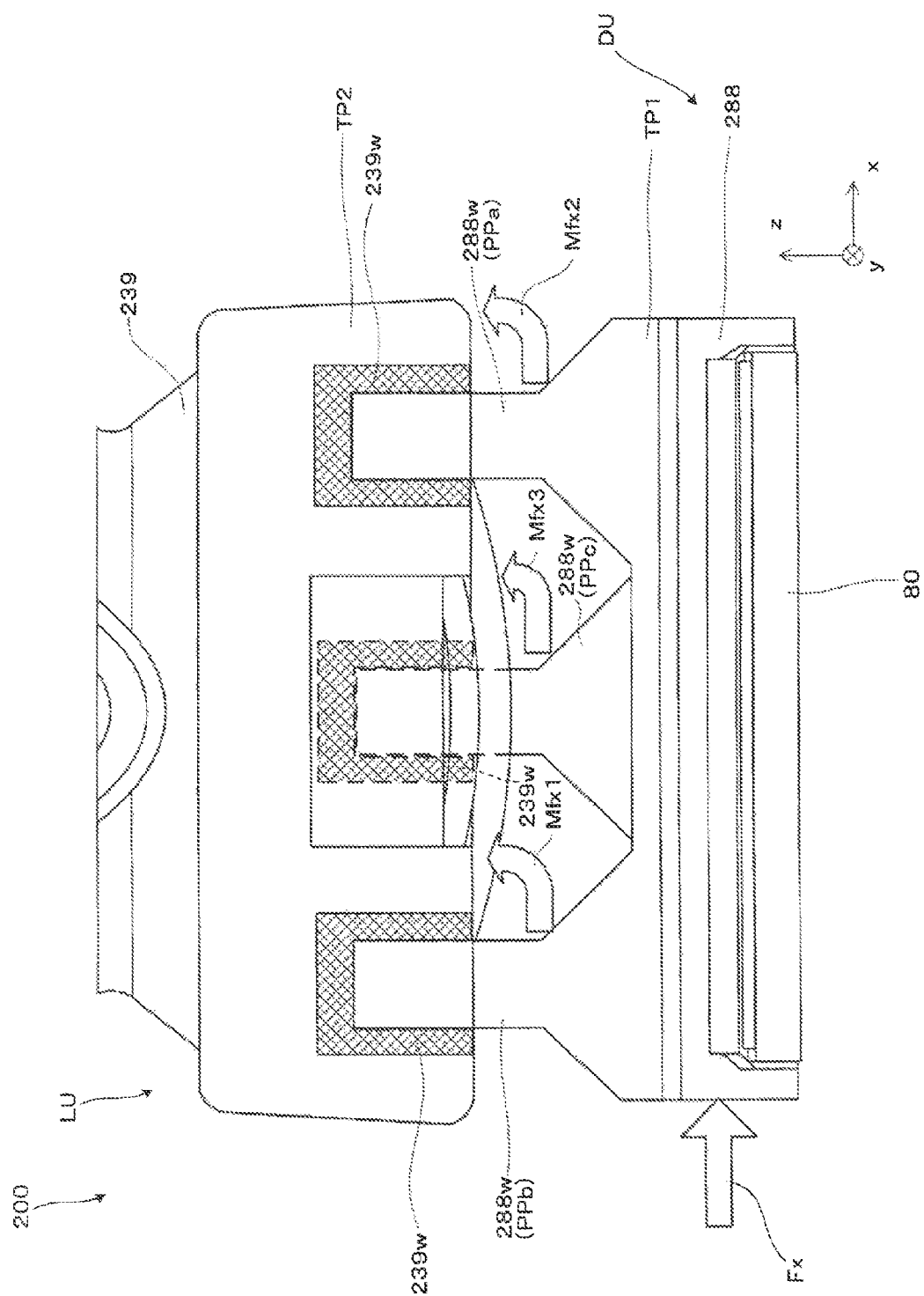
FIG. 15 is a plan view for explaining an example of a virtual image display apparatus according to a second embodiment.

As illustrated in FIG. 15, a virtual image display apparatus 200 is different from the virtual image display apparatus 100 exemplified in the first embodiment in that a front end portion of the first end TP1 of a case member 288 is formed of three protruding portions 288W, 288W and 288W, and a front end portion of the second end TP2 of the optical component holding member 239 is formed of three grooves 239W, 239W and 239W so as to correspond thereto. Specifically, the first end TP1 of the case member 288 has a set of (two) protruding portions PPa and PPb disposed along one side of the image display device 80 in a longitudinal direction (x direction) of the image display device 80, and a single protruding portion PPc disposed on an opposite side to the two protruding portions PPa and PPb with a display region of the image display device 80 interposed therebetween. As illustrated, the protruding portion PPc is disposed at a position at an equal distance or a substantially equal distance from the protruding portions PPa and PPb on another side of the image display device 80. In other words, respective points corresponding to the three disposed protruding portions PPa, PPb and PPc are symmetric while forming vertices of an isosceles triangle. As illustrated, moments at the protruding portions PPa and PPb generated in a case where the external pressure (external force) Fx is applied from the horizontal direction (x direction) are moments Mfx1 and Mfx2 in the same manner as in the first embodiment, and a moment at the protruding portion PPc is a moment Mfx3.

Generally, when compared between a case where a single protruding portion (protruding portion PPc) is provided at the center in the horizontal direction (x direction) as in the present embodiment and a case where two protruding portions are provided as in the first embodiment, a moment tends to further increase in the case where the single protruding portion is provided at the center. In other words, in a case of FIG. 15, there is a probability that the moment Mfx3 may be larger than the moments Mfx1 and Mfx2.

However, as described above, if fixation force at each protruding portion is sufficiently great, and thus an adhesive strength sufficient to resist against the expected moment Mfx3 is ensured, joining can be performed by using the three protruding portions as in the present embodiment.

Also in the virtual image display apparatus 200 according to the present embodiment, the first end TP1 is provided with three protruding portions, the second end TP2 is also provided with three grooves, and the protruding portions and the grooves are fixed to each other. Therefore, it is possible to form a structure which is strong against external force from various directions such as a vertical direction or a horizontal direction. The protruding portion structurally extends along the optical axis direction, and thus the apparatus can be miniaturized.

Others

The invention has been described on the basis of the embodiments, but the invention is not limited to the embodiments, and may be implemented in various aspects within the scope without departing from the spirit thereof.

Figure 16:
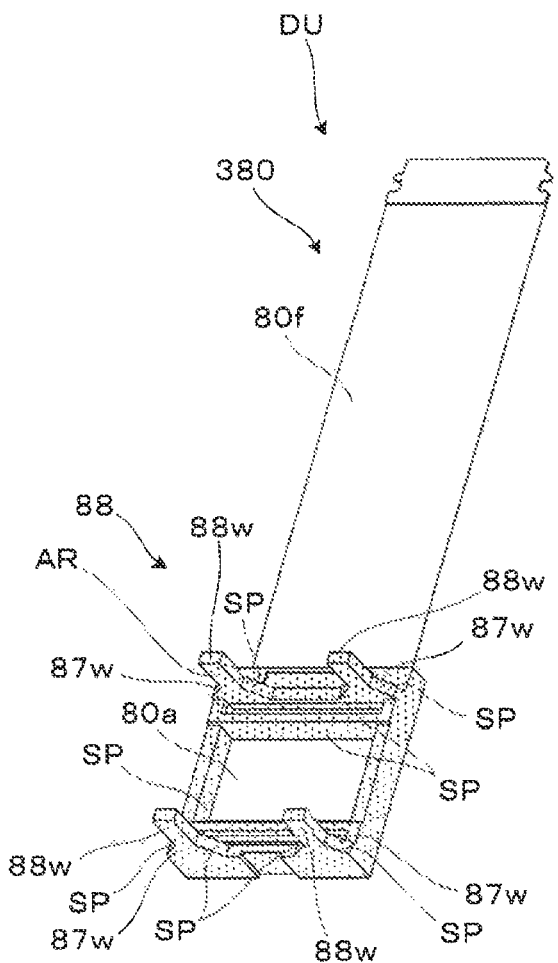
FIG. 16 is a diagram for explaining a display device unit according to a modification example.

For example, as in a display device unit 380 illustrated as a modification example in FIG. 16, a low reflection coating portion AR which is formed by performing low reflection coating for preventing reflection and scattering of light may be provided on a surface (a hatched location in the figure) on the light emission side. In this case, if the low reflection coating portion AR is also formed on the respective protruding portions 88w, 88w, . . . in addition to a location which is necessary to prevent unexpected reflection and scattering of light, surface unevenness is formed by the low reflection coating portion AR, and thus an adhesive strength at each protruding portion 88w can be increased. In the illustrated example, the low reflection coating portion AR is formed on the surface on the light emission side or the entire surface reaching the periphery thereof, but the low reflection coating portion AR is provided on at least a surface portion forming a surface disposed on the video light emission side in the vicinity of the image display device 80, particularly, a surface portion including an inclined surface SP which is inclined with respect to the image display device 80, and a surface including the protruding portions 88w, 88w, . . . , and thus an expected purpose can be achieved.

Figure 17:
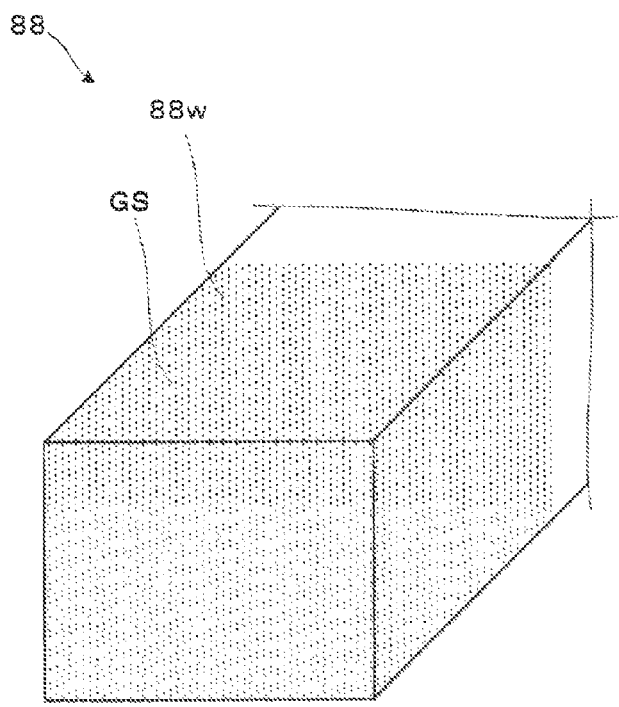
FIG. 17 is a diagram for explaining a display device unit according to another modification example.
Figure 18:
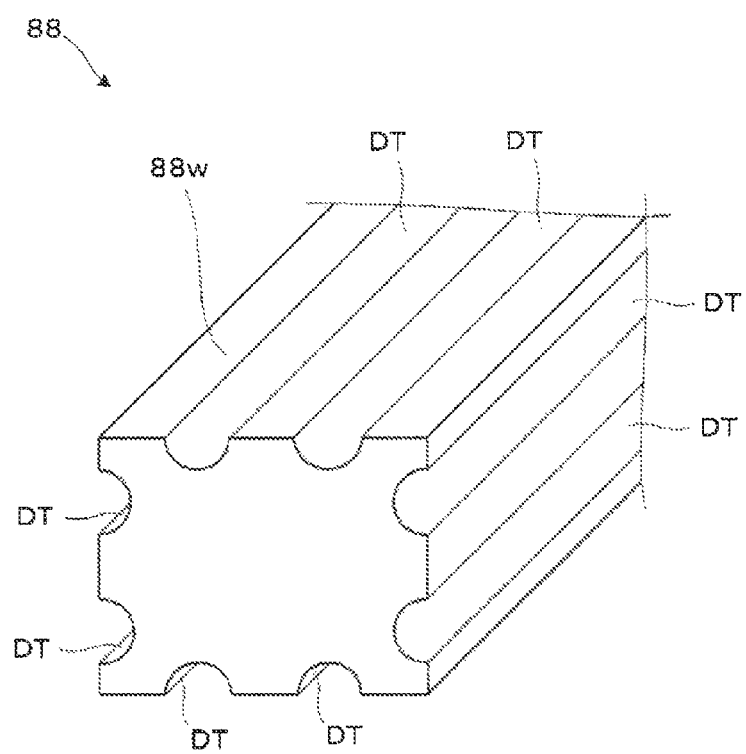
FIG. 18 is a diagram for explaining a display device unit according to still another modification example.

As illustrated in FIG. 17 as another modification example, an embossed structure GS may be provided on a surface (a hatched location in the figure) of the protruding portion 88w of the display device unit. The embossed structure GS is provided on the protruding portion 88w, and thus an adhesive strength can be further increased. As illustrated in FIG. 18 as still another modification example, a groove structure portion DT may be provided on a surface of the protruding portion 88w of the display device unit so that an adhesive strength can be increased. As illustrated, the groove structure portion DT may have a cutout shape along a direction in which the protruding portion 88w extends, and thus release property during molding can be maintained. For example, a dimple shape may be formed on the surface of the protruding portion 88w. The embossed structure or the dimple shape may be formed, for example, by molding the protruding portion 88w through injection molding and then processing the protruding portion.

Figure 19:
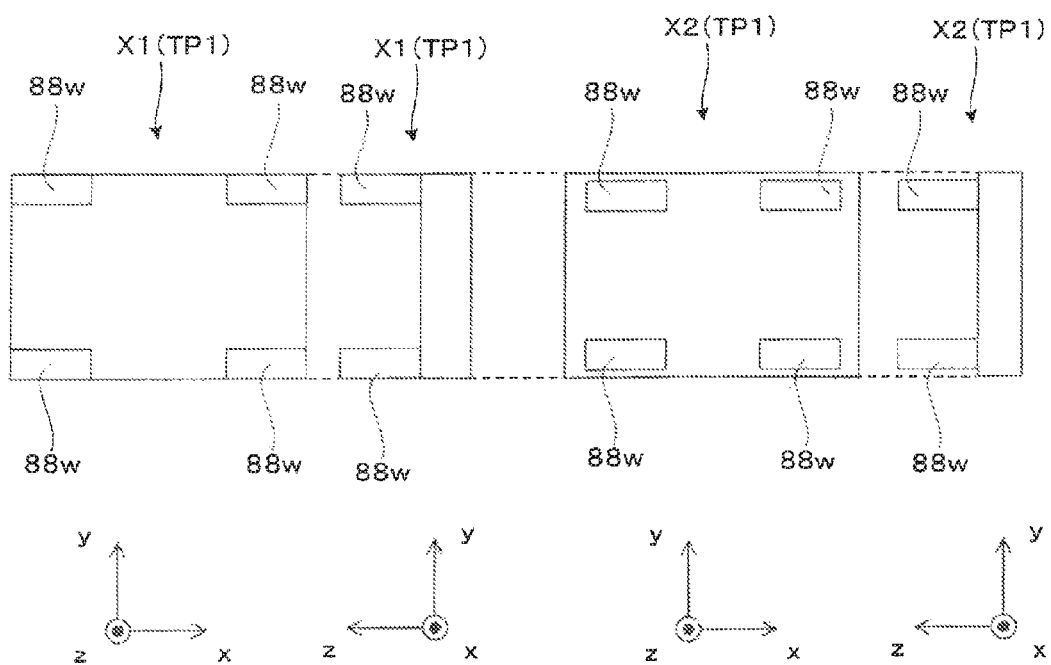
FIG. 19 is a diagram for explaining a modification example of the first end portion.

Regarding the first end TP1 and the second end TP2, as long as the case member 88 and the optical component holding member 39 can be connected to each other, protruding portions may be expected to be provided at various positions on the end side of each member. For example, as in a first end X1 shown as an example of the first end TP1 in FIG. 19, four protruding portions 88w, 88w, . . . may be formed at edges of four corners, but are not limited thereto, and, as in a first end X2 shown as another example, protruding portions may be provided slightly inward from the edges of the four corners.

Figure 20:
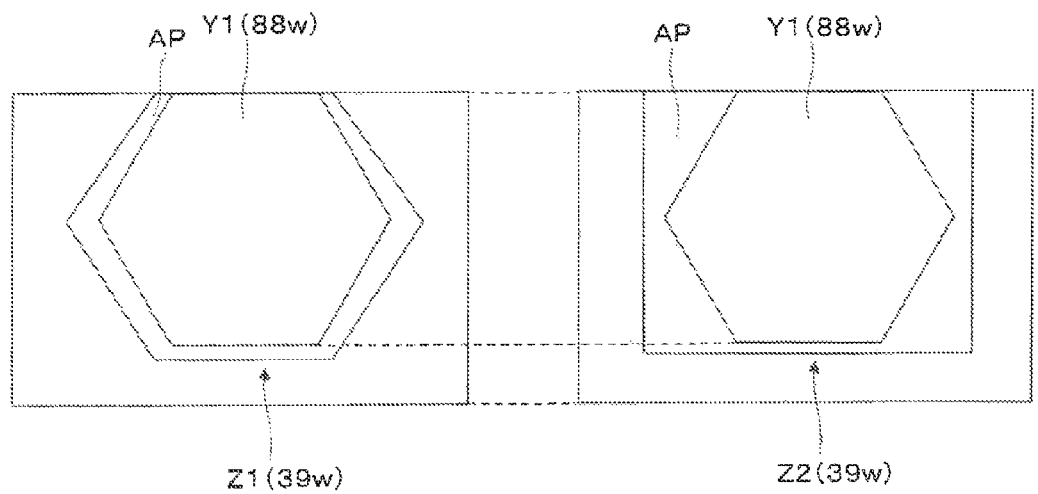
FIG. 20 is a diagram for explaining a modification example of the protruding portion and the groove.

In the above description, a shape of the protruding portion 88w of the display device unit is a square columnar shape, but may be polygonal shapes (for example, a triangular columnar shape or a pentagonal columnar shape). Specifically, for example, on the left part in FIG. 20, as in a protruding portion Y1 and a groove Z1 shown as examples of the protruding portion 88w and the groove 39w, the hexagonal columnar protruding portion Y1 and the groove Z1 having a shape corresponding thereto may be formed. On the right part in FIG. 20, as in a protruding portion Y1 and a groove Z2 shown as other examples of the protruding portion 88w and the groove 39w, the protruding portion Y1 may have a hexagonal columnar shape, but the groove Z2 may have a shape (a square columnar shape in the illustrated example) which is different therefrom.

In the above description, three or more (for example, four) protruding portions 88w, 88w, . . . are provided at the first end TP1 of the first end TP1 and the second end TP2, and three or more (for example, four) grooves 39w, 39w, . . . are provided at the second end TP2, but the protruding portions and the grooves may be provided reversely. In other words, the second end TP2 may be provided with the protruding portions 88w, 88w, . . . , and the first end TP1 may be provided with the grooves 39w, 39w, . . . .

In the above description, the half mirror layer of the second face S12 is, for example, a metal reflection film or a dielectric multi-layer film, but may be replaced with a planar or curved hologram element. The fifth face S15 may be formed not only of a mirror reflection face but also of a hologram element.

In the above description, the light guide member 10 or the like extends in the direction in which the eyes are arranged, but the light guide member 10 may be disposed to vertically extend. In this case, the light guide members 10 have a structure of being disposed not in series but in parallel.

In the above description, a description has been made of an aspect in which image light overlaps external light, but the invention may be applied to, for example, a virtual image display apparatus having an aspect in which only image light is observed without overlapping, or a virtual image display apparatus which switches between an aspect in which only image light is observed and an aspect in which only external light is observed.

The technique of the invention may be applied to a so-called video see-through product formed of a display and an imaging apparatus.

In the above description, the binocular-view virtual image display apparatus including a pair of display devices has been described, but may include a single display device. In other words, there may be a configuration in which an image display device or the like corresponding to only one of the right eye or the left eye is provided, and an image is viewed with only the single eye.

In the above description, the case member has a frame body structure in which the penetration hole is provided at the center thereof, but is not limited thereto. Case members having various shapes may be used according to a necessary light emission amount, a situation of heat generation, a configuration of an image display device, or the like, and, for example, a case member may be used in which a penetration hole portion is formed in a mesh shape, or a case member which is formed in a casing state without a penetration hole may be used.

Figure 11:
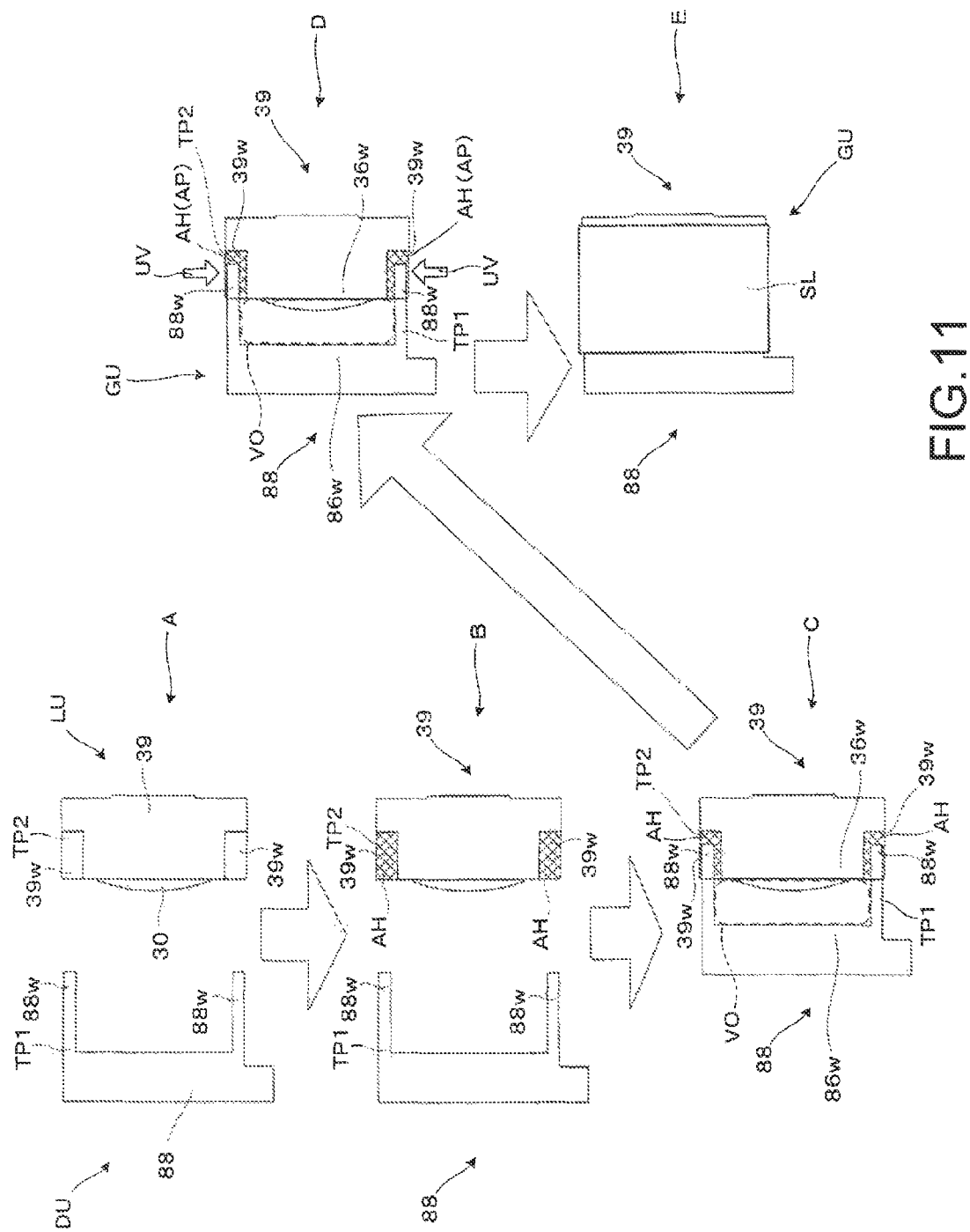
FIG. 11 is a diagram for conceptually explaining examples of procedures of assembling the case member and the optical component holding member.

A unit in which the optical system unit LU and the display device unit DU are assembled with each other will be referred to as an optical display unit GU (for example, steps D and E in FIG. 11). In other words, the optical display unit GU indicates that the entire optical system from a light source or a image element side to a light guide member side is generated as a unit by using, for example, a lens barrel member (optical component holding member 39).

Figure 21:
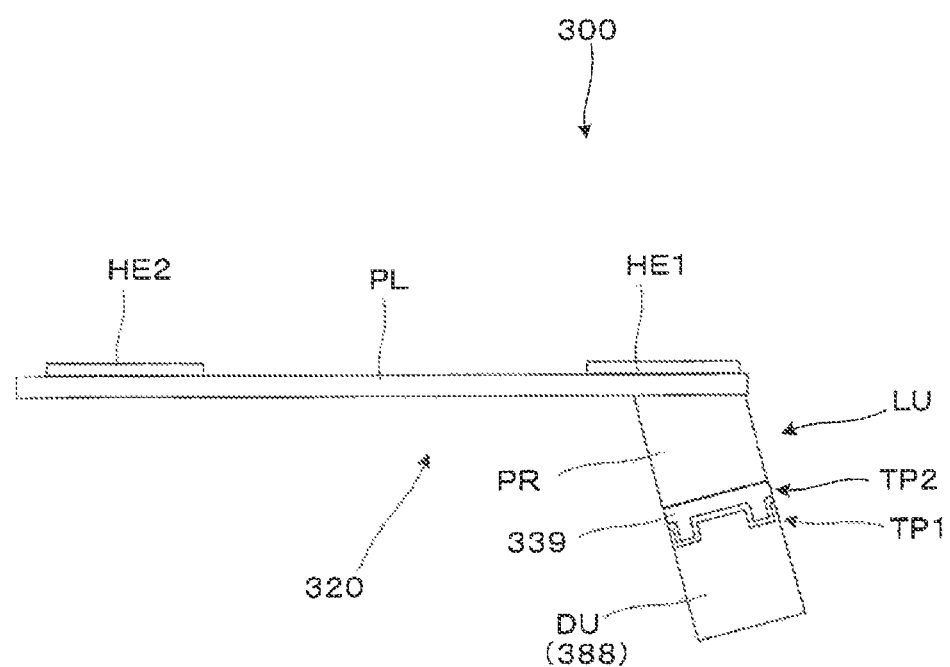
FIG. 21 is a diagram for explaining a modification example of the virtual image display apparatus.

The configurations of the embodiments according to the invention may be applied to an apparatus using a hologram element, such as a virtual image display apparatus 300 exemplified in FIG. 21. Specifically, the virtual image display apparatus 300 is formed of a display device unit DU in which a image element and the like are stored in a case member 388, and a light guide device 320 configured to include hologram elements. The light guide device 320 is provided with a pair of hologram elements HE1 and HE2 on a light incidence side and a light emission side of a light guide plate PL which is a tabular transparent member, and a prism-shaped projection member (projection prism) PR disposed on an optical path front end side of the hologram element HE1 on the light incidence side. The light guide device 320 is assembled with an optical component holding member 339 (for example, a metallic member). It is possible to maintain miniaturization of the apparatus and to form a structure which is strong against external force from various directions by using the first end TP1 provided in the display device unit DU and the second end TP2 provided in the optical component holding member 339.

In the above description, the case member has an integrated structure, but is not limited thereto, and, for example, the case member is formed to have a structure of two members (two components) to which a light source portion and a liquid crystal panel are respectively fixed. The case member may be formed of three or more members (three or more components).

In a virtual image display apparatus having a pair of left and right configurations, the harness member HP is disposed on the lateral side of the optical component holding member 39 or the like as described above, for example, at a location (for the left eye, for example) where a cable from a controller is connected as in the example illustrated in FIG. 1, but may be directly connected without passing the lateral side of the optical component holding member 39 or the like at an opposite location (for the right eye). In other words, in this case, the harness member HP is configured to be provided on the lateral side of the optical component holding member 39 or the like on only one side of a pair of left and right configurations.

The entire disclosure of Japanese Patent Application No. 2016-143106, filed Jul. 21, 2016 is expressly incorporated by reference herein.

What is claimed is:

1. A virtual image display apparatus comprising:
   a case member that stores a image element and is provided with a first end connected to other members;
   an optical component holding member with which an optical component guiding image light from the image element is assembled and that is provided with a second end connected to the first end;
   three or more protruding portions that are provided at one of the first end and the second end, have protrusion shapes, and extend toward the other end;
   three or more grooves that are provided at the other end, have depression shapes corresponding to the three or more protruding portions, and extend; and
   adhesive portions that fix the three or more protruding portions to the three or more grooves in a state in which the case member is aligned with the optical component holding member,
   wherein, among the three or more protruding portions, at least one protruding portion is disposed on an opposite side to one or more other protruding portions with a display region of the image element interposed therebetween.

2. The virtual image display apparatus according to claim 1,
   wherein the three or more protruding portions are disposed at positions corresponding to a peripheral side forming an edge portion of the case member so as to be separated from each other.

3. The virtual image display apparatus according to claim 1,
   wherein, among the three or more protruding portions, at least one protruding portion is disposed on an opposite side to two or more other protruding portions with the display region of the image element interposed therebetween.

4. The virtual image display apparatus according to claim 1,
   wherein, among the three or more protruding portions, two or more protruding portions are disposed along one side of the image element in a longitudinal direction of the display region of the image element.

5. The virtual image display apparatus according to claim 1,
   wherein the three or more protruding portions are formed of four protruding portions disposed to correspond to four corners of the case member.

6. The virtual image display apparatus according to claim 1, further comprising:
   a wiring member that is located near the first and second ends and is disposed on a lateral side on which external force is applied to the adhesive portions from a direction which is perpendicular to a direction in which the first end and the second end are connected to each other.

7. The virtual image display apparatus according to claim 1,
   wherein each of the three or more grooves has wall surface portions formed of a plurality of surfaces.

8. The virtual image display apparatus according to claim 7,
   wherein each of the three or more protruding portions has a prismatic shape, and wherein, in each of the three or more grooves, the wall surface portion is formed of a plurality of surfaces corresponding to a surface shape of a corresponding protruding portion.

9. The virtual image display apparatus according to claim 7,
wherein the wall surface portion is formed of three or more surfaces which are respectively directed in three directions which are orthogonal to each other.

10. The virtual image display apparatus according to claim 9,
wherein two of the three directions which are perpendicular to each other are directions which are orthogonal to an optical axis direction of the image element and the optical component.

11. The virtual image display apparatus according to claim 1,
wherein the three or more protruding portions are disposed to be symmetric to each other with respect to the image element.

12. The virtual image display apparatus according to claim 1,
wherein the adhesive portions are formed of an adhesive filling the respective grooves when the three or more protruding portions are respectively fixed to the three or more corresponding grooves.

13. The virtual image display apparatus according to claim 1,
wherein the adhesive portions are formed of an ultraviolet curable resin.

14. The virtual image display apparatus according to claim 1,
wherein the first end is provided with the three or more protruding portions, and
wherein the case member includes a low reflection coating portion that is provided on at least a surface disposed on a light emission side in the vicinity of the image element, and a surface portion including the three or more protruding portions.

15. The virtual image display apparatus according to claim 14,
wherein the low reflection coating portion is formed on a surface portion including an inclined surface which is inclined with respect to the image element.

16. The virtual image display apparatus according to claim 1,
wherein each of the three or more protruding portions has an embossed structure.

17. The virtual image display apparatus according to claim 1,
wherein, of the first end and the second end, an end provided with the three or more protruding portions is provided with three or more support portions that are provided to respectively correspond to the three or more protruding portions, thicker than the three or more protruding portions, and respectively support the three or more protruding portions.

18. The virtual image display apparatus according to claim 1,
wherein each of the first end and the second end is provided with a void forming portion that is provided at a non-adhesive location and forms a void, and
wherein the virtual image display apparatus further includes a sealing member that seals the void formed by the void forming portion.

19. The virtual image display apparatus according to claim 1,
wherein the image element includes an FPC portion, and
wherein the case member includes an FPC holding member that covers and holds connection locations between the FPC portion of the image element and other members.

* * * * *